US012556988B2

(12) United States Patent
Esswie

(10) Patent No.: US 12,556,988 B2
(45) Date of Patent: Feb. 17, 2026

(54) DYNAMIC CELL RESELECTION

(71) Applicant: Dell Products, L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 390 days.

(21) Appl. No.: 18/166,199

(22) Filed: Feb. 8, 2023

(65) Prior Publication Data
US 2024/0267804 A1 Aug. 8, 2024

(51) Int. Cl.
H04W 36/00 (2009.01)
(52) U.S. Cl.
CPC . H04W 36/00837 (2018.08); H04W 36/0058 (2018.08)
(58) Field of Classification Search
CPC ....... H04W 36/00837; H04W 36/0058; H04W 48/16; H04W 48/20
See application file for complete search history.

(56) References Cited

U.S. PATENT DOCUMENTS

| 2015/0373559 | A1* | 12/2015 | Hong | H04W 52/0206 370/329 |
| 2016/0088570 | A1* | 3/2016 | Cui | H04W 52/18 370/311 |
| 2021/0105847 | A1* | 4/2021 | Prabhakar | H04W 36/26 |
| 2022/0210856 | A1* | 6/2022 | Zhang | H04W 76/34 |
| 2022/0322221 | A1 | 10/2022 | Ianev et al. | |
| 2022/0360996 | A1 | 11/2022 | Luo et al. | |
| 2023/0164690 | A1 | 5/2023 | Yang et al. | |

(Continued)

FOREIGN PATENT DOCUMENTS

| EP | 3 135 063 | 12/2020 |
| WO | 2022/001565 | 1/2022 |

OTHER PUBLICATIONS

Technical specifications (TS) 38.20—"5G; NR; Physical layer; General description", 3GPP TS 38.201 version 15.0.0 Release 15, Sep. 2018, 14 pages.

(Continued)

Primary Examiner — Nizam U Ahmed
(74) Attorney, Agent, or Firm — Amin, Turocy & Watson, LLP

(57) ABSTRACT

Radio access network nodes exchange network energy saving mode information via interfaces between the nodes or via core network backhaul communication links that indicate services or qualities that will be active during active network energy saving mode periods corresponding to the nodes. An idle-mode user equipment may initiate a connection with one of the nodes having a determined highest signal strength by monitoring and decoding information block information that indicates services or qualities for which support will be deactivated during a network energy saving mode. The information block information may indicate another one of the nodes that may offer one of the deactivated services during the network energy saving mode corresponding to the node which transmitted the information block information. The user equipment may connect to the other node to obtain the service even if a determined signal strength of the other node is not the highest of the nodes.

20 Claims, 15 Drawing Sheets

(56) References Cited

U.S. PATENT DOCUMENTS

2024/0267847 A1     8/2024    Esswie

OTHER PUBLICATIONS

Technical specifications (TS) 38.331—"5G; NR; Radio Resource Control (RRC); Protocol specification", 3GPP TS 38.331 version 16.1.0 Release 16, Jul. 2020, 886 pages.
Technical specifications (TS) 38.211—"5G; NR; Physical channels and modulation", 3GPP TS 38.211 version 16.2.0 Release 16, Jul. 2020, 136 pages.
Technical specifications (TS) 38.304—"5G; NR; User Equipment (UE) procedures in idle mode and in RRC Inactive state", 3GPP TS 38.304 version 16.1.0 Release 16, Jul. 2020, 41 pages.
Technical specifications (TS) 38.300—"5G; NR; NR and NG-RAN Overall description; Stage-2" 3GPP TS 38.300 version 16.4.0 Release 16, Jan. 2021, 151 pages.
International Search Report and Written Opinion for PCT Application No. PCT/US2023/035960 mailed Feb. 2, 2024, 20 pages.
CMCC: "Discussion on open issues for slice based cell reselection" 3GPP Draft; R2-2200845, 3GPP TSG-RAN WG2 Meeting #116bis-e, Electronic Meeting, Jan. 11, 2022, [https://ftp.3gpp.org/tsg_ran/WG2_RL2/TSGR2_116bis-e/Docs/R2-2200845.zip], Proposal 13 , 8 pages.
Qualcomm Incorporated—Shankar Krishnan et al: "Information exchange over network interfaces for network energy savings", 3GPP Draft; R3-226525; 3GPP TSG-RAN WG3 Meeting #118-e, Toulouse, FR, Nov. 4, 2022, [https://www.3gpp.org/ftp/TSG_RAN/WG3_I u/TSGR3_118/Docs/R3-226525.zip], 6 pages.
Catt: "Cell selection and re-selection based on slice" , 3GPP Draft; R2-1707893, 3GPP TSG-RAN WG2 #99, Berlin, Germany, Aug. 20, 2017, [http://www.3gpp.org/ftp/Meetings_3GPP_ SYNC/RAN2/Docs/], 2 pages.
International Search Report and Written Opinion for PCT Application No. PCT/US2023/035962 mailed Feb. 7, 2024, 16 pages.
Vivo—Jianhui Li et al: "Discussion on cell selection/reselection", 3GPP Draft; R2-2211666; 3GPP TSG-RAN 2 WG2 Meeting #120, Toulouse, FR, Nov. 4, 2022, [https://www.3gpp.org/ftp/TSG_RAN/WG2_R L2/TSGR2_120/Docs/R2-2211666.zip ], Proposal 3 , 5 pages.
Qualcoom Incorporated—Sherif Elazzouni et al: "NES NW Network DTX/DRX Techniques", 3GPP Draft; R2-2211586; 3GPP TSG-RAN WG1 Meeting #120, Toulouse, FR, Nov. 3, 2022, [https://www.3gpp.org/ftp/TSG_RAN/WG2_R L2/TSGR2_120/Docs/R2-2211586.zip], R2-2211586 NW NES DTX-DRX mechanism.docx, Proposal 6, 6 pages.
Esswie, Ali. "Dynamic Cell Reselection" U.S. Appl. No. 18/166,180, filed Feb. 8, 2023, 81 pages.
Notification Concerning Transmittal of the International Preliminary Report on Patentability mailed Aug. 21, 2025 for PCT Application No. PCT/US2023/035962, 9 pages.
ETRI: "NW DTX/DRX operation for NES, 3GPP Draft; R2-2210383, vol. RAN WG2, No. Online meeting; 2022, [https://ftp.3gpp.org/tsg_ran/WG2_RL2/TSGR2_ 119bis-e/Docs/ R2-2210383.zip R2-2210383 NW DTXDRX operation for NES.doc]" 2 pages.
Notification Concerning Transmittal of the International Preliminary Report on Patentability mailed Aug. 21, 2025 for PCT Application No. PCT/US2023/035960, 13 pages.
Office Action mailed Sep. 23, 2025 for U.S. Appl. No. 18/166,180, 81 pages.

* cited by examiner

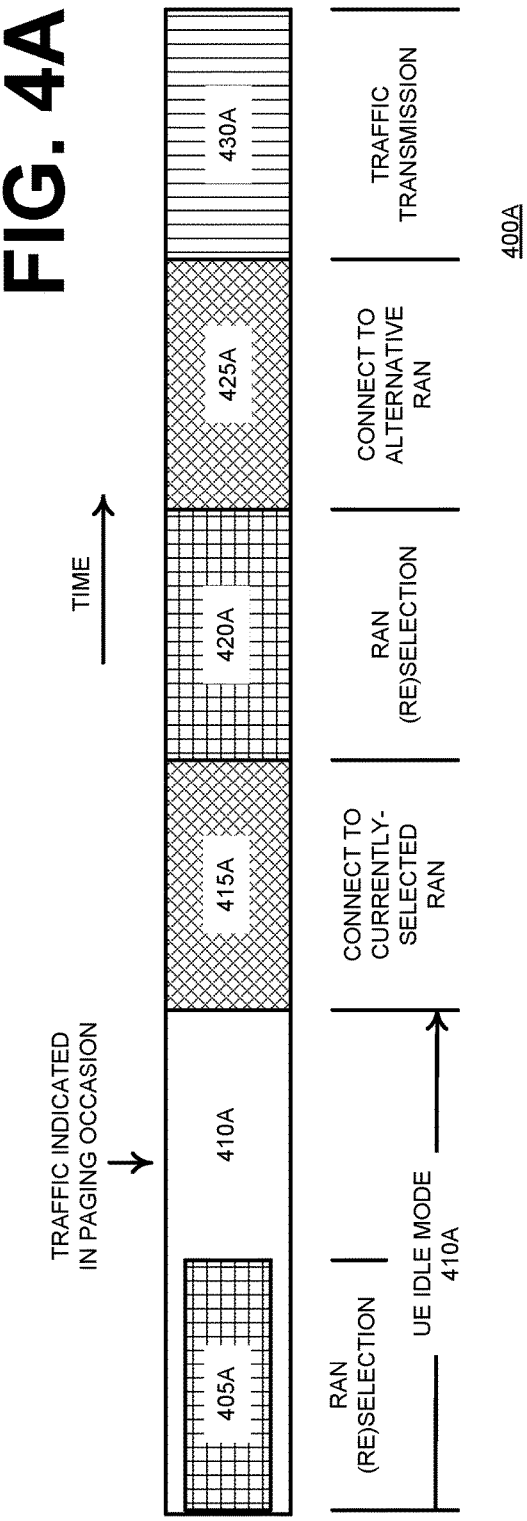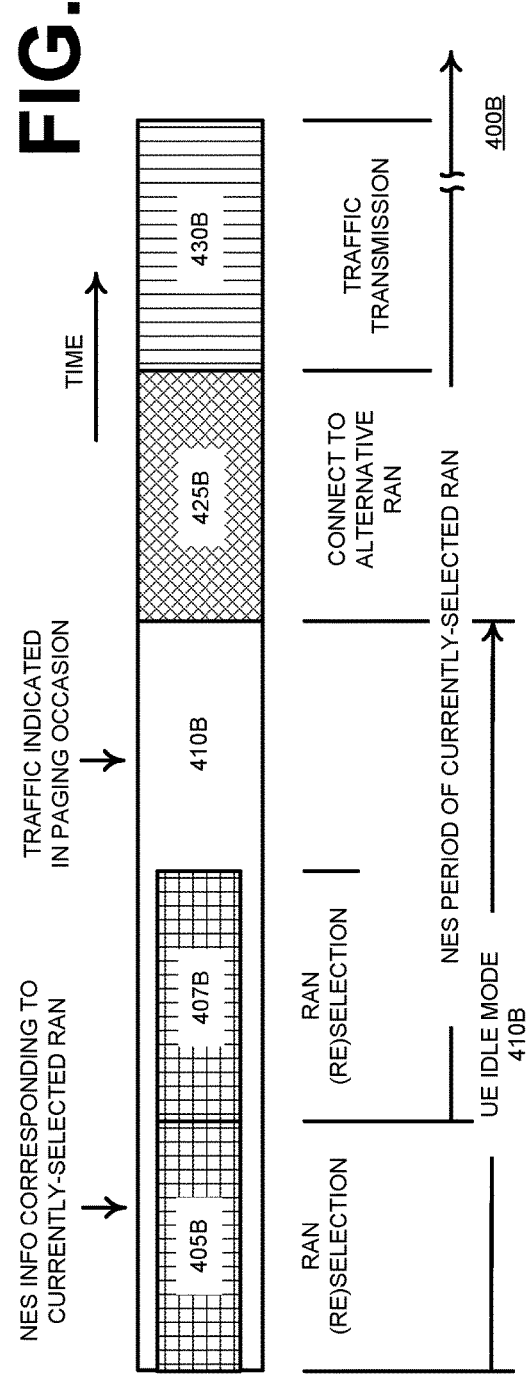

DYNAMIC CELL RESELECTION

BACKGROUND

The 'New Radio' (NR) terminology that is associated with fifth generation mobile wireless communication systems ("5G") refers to technical aspects used in wireless radio access networks ("RAN") that comprise several quality of service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary. A RAN node may activate a network energy saving mode to reduce power consumption.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method comprises activating, by a first network access network node comprising a processor, a network energy saving mode, comprising at least one service being in an inactive state, for a network energy saving mode period of time. The example method may comprise receiving, by the first radio access network node from a second radio access network node, a first services-active message comprising a first services-active indication indicative of the second radio access network node actively providing a first service of the at least one service that is in the inactive state at the first radio access network node. The first services-active message may comprise services or qualities that the second radio access network node will support during an active network energy saving mode at the second radio access network node. The example method may further comprise receiving, by the first radio access network node from a first user equipment, a request for the first service, and, responsive to the request for the first service, transmitting, by the first radio access network node to the first user equipment, a first information message comprising an alternative radio access network node indication indicative of the first service being actively provided by the second radio access network node. (The first information message may comprise new information elements 515 as described in reference to FIG. 5). The first information message may comprise a system information block 1 (e.g., information elements indicated in an SMB[1] information block).

In an embodiment, the example method may further comprise transmitting, by the first radio access network node to the second radio access network node, a request for the first services-active indication indicative of one or more services that are active at the second radio access network node, wherein the first services-active message is responsive to the request for the first services-active indication. A request for services-active indication or a services-active messages may be communicated between radio access network nodes via an XN interface or via a backhaul link service.

In an embodiment, the example method may further comprise broadcasting, by the first radio access network node, a services-inactive indication, indicative of the at least one service being in the inactive state at the first radio access network node, wherein the first services-active message is responsive to the services-inactive indication.

In an embodiment, the example method may comprise broadcasting, by the first radio access network node, a services-inactive indication, indicative of the at least one service being in the inactive state at the first radio access network node for an inactive period of time of the network energy saving mode, which inactive period may be indicated as an information element in the first information message. The inactive period of time of the network energy saving mode may be less than the network energy saving mode period of time. (E.g., a radio access network node may deactivate a given service or quality for less time than another service or quality is deactivated during the network energy saving mode period.) The first information message may comprise a first service inactive period indication indicative of a time, for example a beginning time, and ending time, or a duration, corresponding to the inactive state of the first service at the first radio access network node during the network energy saving mode.

In an embodiment, the example method may further comprise receiving, by the first radio access network node from a third radio access network node, a second services-active message comprising a second services-active indication indicative of the third radio access network node actively providing a second service of the at least one service that is in the inactive state at the first radio access network node. The method may comprise receiving, by the first radio access network node from a second user equipment, a request for the second service, and, responsive to the request for the second service, transmitting, by the first radio access network node to the second user equipment, a second information message comprising a second alternative radio access network node indication indicative of the second service being actively provided by the third radio access network node. The second service may be one of the at least one service that is in the inactive state at the first radio access network node. Accordingly, the first UE may request a service that is deactivated at the first RAN during a NES mode thereof and that is actively supported at the second RAN, and the second UE may request a service that is deactivated at the first RAN and at the second RAN during a NES mode of the first RAN, but that is actively supported at the third RAN during the NES mode of the first RAN.

In an embodiment, the network energy saving mode may be a first network energy saving mode, and the example method may further comprise receiving, by the first radio access network node from a third radio access network node, a second services-active message comprising a second services-active indication indicative of the third radio access network node actively providing the first service. In the embodiment, the first information message may comprises a first service inactive period indication indicative of a first time corresponding to the inactive state of the first service at the first radio access network node during of the first network energy saving mode. The first information message may comprise a second service active period indication indicative of a second time corresponding to the first service being actively provided by the second radio access network node at the second radio access network node during a second network energy saving mode at the second radio access network node.

In an embodiment, a first radio access network node may comprise a processor configured to receive, from a second radio access network node, a request for an indication of active services at the first radio access network node. The processor may be configured to transmit, to the second radio access network node responsive to the request for the indication of active services, an active services message comprising an active services indication indicative of a service being active at the first radio access network node. Responsive to a connection establishment request received from a user equipment, the processor of the first radio access network node may be configured to establish a connection with the user equipment; wherein the user equipment transmitted the connection establishment request according to a first identifier corresponding to the first radio access network node indicated in an information message received by the user equipment from the second radio access network node, and wherein the second radio access network node included the first identifier in the information message based on the service being indicated in the active services message as being active at the first radio access network node. Accordingly, the second radio access network node may be a radio access network node that the user equipment has selected to camp on and to establish a connection with if there is traffic to be transmitted to the user equipment, and the first radio access network node may be a radio access network node that will be offering a service that the user equipment may need during a network energy saving mode at the second radio access network node. In an embodiment, the information message may comprise a system information block 1 information element. In an embodiment, the request for the indication of active services at the first radio access network node comprises the indication of at least one service being inactive at the second radio access network node.

In an embodiment, the processor of the first radio access network node may be further configured to generate the active services indication of the active services message to be indicative of at least one service that is active at the first radio access network node and that is inactive at the second radio access network node.

In an embodiment, the information message transmitted to the user equipment from the second radio access network node may comprise a service inactive period indication indicative of a time corresponding to the at least one service being inactive at the second radio access network node during a network energy saving mode at the second radio access network node. At least one of the request for the indication of active services or the active services message may be transported via at least one of an Xn interface link communicatively coupled with the first radio access network node or the second radio access network node, or a backhaul link, or backhaul link service, of a core network communicatively coupled with, or communicatively supportive of, the first radio access network node or the second radio access network node.

In another example embodiment, a non-transitory machine-readable medium, comprises executable instructions that, when executed by a processor of a first radio access network node, facilitate performance of operations, comprising activating a network energy saving mode comprising a service being in an inactive state at the first radio access network node and broadcasting, to at least one other radio access network node other than the first radio access network node, a request for indication of active services at the at least one other radio access network node. The operations may further comprise receiving, from a second radio access network node of the at least one other radio access network node, a service-active message comprising a service-active indication indicative of the service being in an active state at the second radio access network node. The operations may further comprise broadcasting an information block comprising a service available indication indicative of the service being in the active state at the second radio access network node. The service available indication may comprise, or refer to, an identifier corresponding to the second radio access network node. The information block may be a system information block 1, or part of or an element of, a system information block 1.

The request for the indication of active services may comprise an inactive service indication indicative of the service, and wherein the inactive service indication comprises at least one of: a service identifier corresponding to the service or a quality indication corresponding to a quality of the service.

In an embodiment, the operations may further comprise receiving, from a third radio access network node of the at least one other radio access network node, a service-active message comprising a service-active indication indicative of the service being in an active state at the third radio access network node, wherein the service available indication is indicative of the service being in the active state at the third radio access network node.

In another embodiment, an example method may comprise determining, by a user equipment comprising a processor, a first parameter metric corresponding to a first radio access network node. The example method may comprise analyzing the first parameter metric (e.g., signal strength corresponding to the first RAN) with respect to a configured first parameter criterion (e.g., a signal strength threshold, or a function that is satisfied by a signal strength corresponding to a given RAN being higher than a signal strength corresponding to other RANs that could provide wireless communication service to the user equipment), to result in an analyzed first parameter metric. The example method may further comprise initiating, by the user equipment, a connection establishment procedure with the first radio access network node based on the analyzed first parameter metric being determined to satisfy the configured first parameter criterion, and receiving, by the user equipment from the first radio access network node, an information message comprising an inactive-services indication indicative of at least one service that is in an inactive state at the first radio access network node and an alternative radio access network node indication indicative of a second radio access network node at which the at least one service is in an active state. The information message may contain new information elements 515 described in reference to FIG. 5. The information message may be part of a synchronization signal block message and the initiating of the connection establishment may comprise merely receiving and decoding the synchronization signal block message without performing random access procedures by the user equipment with the first radio access network node.

In an embodiment, the example method may further comprise establishing, by the user equipment, a connection with the second radio access network node, based on the alternative radio access network node indication that may be a new information element 515 contained in the information message. The alternative radio access network node indication may comprise an identifier of the second radio access network node. In an embodiment, the alternative radio access network node indication is received from the first radio access network node in a system information block 1 message. In an embodiment, the configured first parameter criterion comprises a signal strength criterion, and wherein the first parameter metric is a first signal strength indication indicative of a first signal strength corresponding to the first radio access network node.

In an embodiment, the example method may comprise determining, by the user equipment, a second parameter metric corresponding to the second radio access network node, and the method may further comprise analyzing the second parameter metric with respect to the configured first parameter criterion to result in an analyzed second parameter metric. The second parameter metric may be a second signal strength indication indicative of a second signal strength corresponding to the second radio access network node, the configured first parameter criterion may comprise a signal strength threshold, the analyzed first parameter metric may be determined to satisfy the configured first parameter criterion, and the analyzed second parameter metric may be determined to satisfy the configured first parameter criterion. The example method may further comprise establishing, by the user equipment, a connection with the second radio access network node, based on the alternative radio access network node indication. Described another way, signal strength determinations made by the user equipment corresponding to the first radio access network node and the second radio access network node may be deemed to be supportive of adequate wireless communication service, and the user equipment may select the second radio access network node because the second radio access network node is offering a service needed by the user equipment during an network energy saving mode of the first radio access network node, even if the second radio access network node is determined to correspond to a less strong signal at the user equipment that a signal strength corresponding to the first radio access network node.

In an embodiment, the example method may comprise determining, by the user equipment, a second parameter metric corresponding to the second radio access network node and establishing, by the user equipment, a connection with the second radio access network node according to the alternative radio access network node indication. The second parameter metric may be a second signal strength indication indicative of a second signal strength corresponding to the second radio access network node, the first signal strength may be higher than the second signal strength, and the configured first parameter criterion may comprise a function that is satisfied by the first signal strength being higher than the second signal strength. The establishing of the connection with the second radio access network node, according to the alternative radio access network node indication, may comprise overriding the configured first parameter criterion. In other words, the user equipment may determine to select the second radio access network node to establish an RRC connection with even if the first radio access network node provides a stronger signal at the user equipment than the second radio access network node because a service that the user equipment may need is inactive at the first radio access network node but is active at the second radio access network node.

In an embodiment, the alternative radio access network node indication may be indicative of a third radio access network node at which the at least one service is in an active state. The example method may further comprise determining, by the user equipment, a third parameter metric corresponding to the third radio access network node. The third parameter metric may be a third signal strength indication indicative of a third signal strength corresponding to the third radio access network node, the first signal strength may be higher than the second signal strength, the second signal strength may be lower than the third signal strength, and the configured first parameter criterion may comprise a function that is satisfied by the first signal strength being higher than the second signal strength or by the third signal strength being higher than the second signal strength. The example method may further comprise determining, by the user equipment, a service, of the at least one service indicated by the inactive-services indication, requested by the user equipment, to result in a determined service. The inactive-services indication may be indicative of a first period indication indicative of a first time corresponding to the inactive state of the determined service at the first radio access network node, a second period indication indicative of a second time corresponding to the active state of the determined service at the second radio access network node, and a third period indication indicative of a third time corresponding to the active state of the determined service at the third radio access network node. The example method may further comprise determining, by the user equipment, a second parameter criterion corresponding to use by the user equipment of the determined service and analyzing the first time, the second time, and the third time with respect to the second parameter criterion, to result in: a determined first service-availability, a determined second service-availability, and a determined third service-availability, respectively. The example method may further comprise determining that the determined second service-availability satisfies the second parameter criterion and that the third service-availability fails to satisfy the second parameter criterion, wherein establishing a connection with the second radio access network node comprises overriding the configured first parameter criterion. In an embodiment, the second parameter criterion comprises a needed time of use of the determined service by the user equipment. In an embodiment, the user equipment may comprise a machine-to-machine device.

In an embodiment, the second parameter metric may be a second signal strength indication indicative of a second signal strength corresponding to the second radio access network node wherein the first signal strength is higher than the second signal strength, wherein the configured first parameter criterion comprises a function that is satisfied by the first signal strength being higher than the second signal strength. The inactive-services indication may be indicative of: a first period indication indicative of a first time corresponding to the inactive state of the determined service at the first radio access network node and a second period indication indicative of a second time corresponding to the active state of the determined service at the second radio access network node. The example method may further comprise determining, by the user equipment, a service, of the at least one service indicated by the inactive-services indication, requested by the user equipment, to result in a determined service; determining, by the user equipment, a second parameter criterion comprising a requested time of use of the determined service by the user equipment; and analyzing, by the user equipment, the first time and the second time with respect to the second parameter criterion, to result in: a determined first service-availability and a determined second service-availability. The example method may further comprise determining, by the user equipment, that the determined first service-availability satisfies the second parameter criterion and that the determined second service-availability satisfies the second parameter criterion; and establishing, by the user equipment, a connection with the first radio access network node according to the first time.

In another embodiment, a user equipment comprises a processor configured to: determine a first parameter metric corresponding to a first radio access network node; determine a second parameter metric corresponding to a second radio access network node; analyze the first parameter metric with respect to a configured parameter criterion to result in an analyzed first parameter metric; and analyze the second parameter metric with respect to the configured parameter criterion to result in an analyzed second parameter metric. The processor of the user equipment may be further configured to determine a requested resource to request from the first radio access network node or from the second radio access network node, and initiate a connection with the first radio access network node based on the analyzed first parameter metric satisfying the configured parameter criterion and based on the analyzed second parameter metric failing to satisfy the configured parameter criterion. The processor of the user equipment may be further configured to receive, from the first radio access network node, an information block comprising an unavailable-resources indication indicative of the requested resource being unavailable at the first radio access network node, wherein the information block comprises an alternative radio access network node indication indicative of the requested resource being available at the second radio access network node.

In an embodiment, the processor of the user equipment may be further configured to determine to disregard the analyzed second parameter metric failing to satisfy the configured parameter criterion, and establish a connection with the second radio access network node based on the alternative radio access network node indication.

The alternative radio access network node indication may comprise an identifier corresponding to the second radio access network node. The requested resource may comprise a service and herein the unavailable-resources indication may comprise a service identifier corresponding to the service. The requested resource may comprise a Quality-of-Service requested to support a service, and the unavailable-resources indication may comprise a Quality Class Indication indicative of the Quality-of-Service requested to support the service not being available at the first radio access network node.

In yet another embodiment, an example non-transitory machine-readable medium comprises executable instructions that, when executed by a processor of a user equipment, facilitate performance of operations, comprising: initiating a connection with a first radio access network node and receiving, from the first radio access network node, an information message comprising an information block, wherein the information block may comprise an inactive-services indication indicative of at least one inactive service at the first radio access network node and wherein the information block may comprise an alternative radio access network node indication indicative of a second network access network node at which at least one of the at least one inactive service is active.

In an embodiment of the example non-transitory machine-readable medium, the operations may further comprise determining an application service to be used by an application being executed by the processor; determining a first parameter metric corresponding to the first radio access network node; determining a second parameter metric corresponding to the second radio access network node; and analyzing the first parameter metric and the second parameter metric with respect to a configured connection criterion to result in the first radio access network node being determined by the user equipment as a selected radio access network node. The user equipment may be configured, according to the configured connection criterion, to transition from an IDLE state, or in an embodiment, from an INACTICE state, to a CONNECTED state by establishing connection to the selected radio access network node. The operations may further comprise determining that the application service is one of the at least one inactive service that is active at the second radio access network node, overriding the configured connection criterion based on the application service being one of the at least one inactive service that is active at the second radio access network node, and establishing a connection to the second radio access network node based on the overriding of the configured connection criterion. The alternative radio access network node indication may comprise an identifier of the second radio access network node. The alternative radio access network node indication may comprise a network energy saving mode duration indication indicative of a time corresponding to the at least one inactive service at the first radio access network node being inactive.

BRIEF DESCRIPTION OF THE DRAWINGS

FIG. 4A illustrates resource usage according to existing radio access network node reselection procedures.

FIG. 4B illustrates resource usage according to an example embodiment of proactive reselection.

DETAILED DESCRIPTION OF THE DRAWINGS

Figure 1:
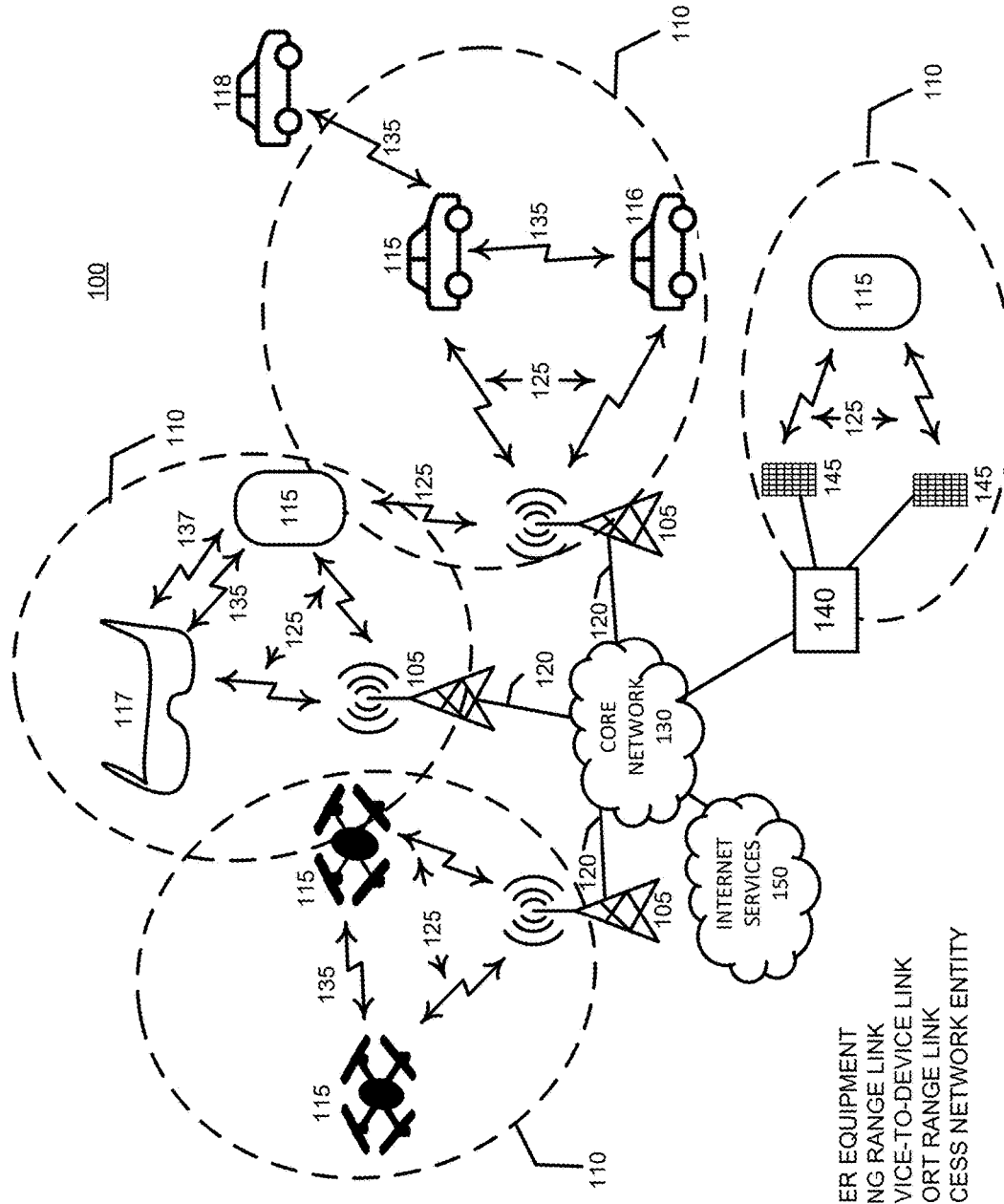
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Turning now to the figures, FIG. 1 illustrates an example of a wireless communication system 100 that supports blind decoding of PDCCH candidates or search spaces in accordance with one or more example embodiments of the present disclosure. The wireless communication system 100 may include one or more base stations 105, one or more user equipment ("UE") devices 115, and core network 130. In some examples, the wireless communication system 100 may comprise a long-range wireless communication network, that comprises, for example, a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 12.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $Ts=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications, such as sidelink communication, may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both. In FIG. 1, vehicle UE 116 is shown inside a RAN coverage area and vehicle UE 118 is shown outside the coverage area of the same RAN. Vehicle UE 115 wirelessly connected to the RAN may be a sidelink relay to in-RAN-coverage-range vehicle UE 116 or to out-of-RAN-coverage-range vehicle UE 118.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHZ, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Network energy saving.

Energy or power saving is desirable in cellular networks, for both network equipment and user equipment. An objective of Network Energy Saving ("NES") mode is to facilitate a RAN node, that may be experiencing high power consumption, limited battery capacity, or power source disruptions, dynamically relaxing support one or more radio functions, or one or more radio services, that the RAN node may otherwise support, until an improvement in power situation is achieved, for example, an off-site power source of the RAN node being restored such that the RAN no longer relies on power from a battery on-site at the RAN, or until capacity of an on-site battery is restored to a configured level. Implementing NES may facilitate cost efficiency or power efficiency at the RAN node, (e.g., activating NES mode during a light load time for a RAN that experiences a high variance rate of traffic loads throughout a given day), or may facilitate service continuity, especially for emergency services/calls, in case of power source disruptions/outage.

Accordingly, a cell's RAN node may dynamically implement NES mode to temporarily halt support of, or offering of, high-energy-consumption radio services for a determined or configured period. Non-limiting examples of power-heavy radio services, or operations, include ultra-fast scheduling associated with mini-slot scheduling for latency-critical services, data duplication for enhanced radio reliability, and others. For already-connected user equipment (e.g., a user equipment that is RRC CONNECTED with a RAN), the RAN may already be aware of services, traffic types, and quality of service (QOS) targets, corresponding to traffic flows associated with the already-connected user equipment. Thus, the RAN node can determine to avoid NES mode activation to avoid negatively impacting critical traffic currently being served to the user equipment by the RAN. However, the RAN node may not be aware of a user equipment in an IDLE mode that are not actively connected to the RAN node even if the idle mode user equipment are within a coverage area, or range, of the RAN and the RAN node may not be aware of target QoS targets or services that may be needed, or requested, by an idle user equipment when user equipment later initiates connection to the RAN node. Thus, according to current implementations, an idle mode user equipment device, which may be camped on a NES-mode-activated RAN node, may only be aware of the NES mode activation by the RAN and the services which are currently not offered or not supported by the RAN node, when the user equipment initiates connection establishment procedures with the RAN node. Such initiation of connection procedures may comprise user equipment devices executing random access procedures and corresponding subsequent power-heavy and signaling-heavy connection establishment procedures. Only after initiating and connecting to the RAN node may the user equipment become aware that the RAN node has activated NES mode and is not currently offering or supporting a service or radio function that the user equipment may need to request, which may result in the user equipment discarding the established connection with the RAN and attempting reselection of another neighboring RAN node. Such connecting of the user equipment to the RAN node may lead to energy inefficiency at both the RAN node and at the user equipment as well as wasted signaling overhead and a delayed network access of impacted idle devices.

Currently, several schemes for implementing network power savings may be implemented. An example of a currently implemented NES mode procedure is Aggregated Paging Occasions ("APO"), wherein user equipment devices are aggregated to monitor and blindly decode the same paging occasion. This reduces the total number of paging occasions a RAN node has to transmit but comes at the expense of idle mode devices waking up and decoding the same paging occasion that may include paging information for only a single user equipment device, (e.g., a paging 'false alarm'). With APO, benefits of NES may be overshadowed by increased energy consumption at aggregated user equipment devices due to paging false alarms.

Another example of a currently implemented NES mode procedure is for a cell/RAN node to shut down and not accept new connection requests from user equipment that are not currently connected to the cell/RAN. Shutting down the accepting of new connection requests, or even stopping current device connections for all or part of one or more active services, is a straightforward NES solution, but one that may cause a negative impact on a user equipment's achievable quality of service. Furthermore, shutting down accepting of new connection request may lead to coverage gaps, where an idle user equipment may be unaware of, or 'blind' to, the halting of services resulting in the user equipment attempt to connect to the RAN (and thus expending battery power and time resources of the user equipment) notwithstanding that the RAN is not currently offering a service that the user equipment needs to the RAN. In case of a need for an emergency service, such as fire, rescue, law enforcement, etc., a user equipment being blind to radio services that have been deactivated by a RAN may impose a safety risk to a user of the blind user equipment.

Idle mode operations comprise several procedures for user equipment devices in idle mode, for example: determining coverage level/signal strength corresponding to surrounding cells; camping on, or selecting, a certain cell/RAN; or monitoring a detected coverage level/signal strength of the cell/RAN in case the user equipment moves or radio conditions change. Idle mode devices may be viewed as active user equipment that are not connected to a cell/RAN, thus the RAN network is not aware of locations of idle mode devices and a density of idle user equipment.

When a user equipment device is turned on, the user equipment device searches for and attempts decoding synchronization signal blocks ("SSB") of surrounding cells—SSBs are typically the sole always-transmitted signals of a 5G RAN node. An SSB enables idle mode devices to, for example: obtain downlink radio frequency ("RF") receiver synchronization with the surrounding cells/RANs; determine cell identifiers of the surrounding cells/RANs; and determine coverage levels using SSB downlink reference signal (e.g., the user equipment may determine signal strength based on reference signal received power ("RSRP") corresponding to each of the detected cells/RANs).

Accordingly, an idle mode device, based on detected SSBs, and determined coverage levels of surrounding cells/RANs corresponding to the determined cell/RAN identifiers, selects a stand-by cell/RAN to camp on that offers the best coverage level/determined signal strength. The user equipment initiates a connection to the stand-by cell/RAN (e.g., initiates an RRC connection) when the user equipment needs to connect to the network, (e.g., for receiving a call or for initiating an uplink data session without using time to perform cell selection, since the cell/RAN selection has already been performed). Thus, cell/RAN selection procedures are typically periodically executed regardless of whether the idle mode device needs to connect to the cell/RAN.

An idle mode device may initiate cell re-selection using the same procedure as cell selection but searching for another cell than the one previously selected/currently-selected at an instant according to an idle mode period configured at the user equipment or periodically according to a configuration received from the cell/RAN. Cell/RAN re-selection benefits a user equipment because a given selected cell/RAN that was optimum with respect to the user equipment at one time may not provide a determined strongest signal strength at a later time, which scenario may occur if the idle mode user equipment is moving between cells or if channel radio conditions change. Thus, when a coverage degradation of a currently selected cell is detected (based on a defined set of conditions being satisfied), an idle mode device may initiate idle-mode reselection. A cell/RAN node is typically not aware of a reselection determination made by an idle mode device.

For a given selected cell, an idle mode device monitors SSB information transmitted from the cell/RAN and monitors the determined paging occasion(s) corresponding to the cell/RAN. Monitoring SSB information facilitates an idle mode device staying up-to-date regarding coverage levels of the selected cell/RAN and triggering cell-reselection if needed to support an incoming call or data traffic transmission.

Thus, although cells/RANs transmit SSB blocks facilitates user equipment transition from a low-power IDLE mode to a higher power CONNECTED mode, transmission of SSB blocks is an energy-heavy operation at a cell/RAN.

When an idle mode user equipment connects to a RAN node (e.g., transitions from idle to connected mode), the user equipment 'assumes' that services, or QoS profiles that it is pursuing, or requesting, are offered by the currently selected cell. If an idle mode user equipment transitions to a connected mode and then determines that a service that the user equipment needs is inactive at the RAN it is connected to, the UE has expended battery power and time resources in establishing the fruitless connection.

Not offering one or more services or QoS profiles to either connected user equipment or to currently idle user equipment that are transitioning to a connected state with the RAN may not problematic for connected mode user equipment devices because the RAN already has awareness of the user equipment devices and QoS targets and services needed, or targeted, by the user equipment. A RAN node may avoid halting support of active services being used by user equipment during the active NES mode, or the RAN may be configured to cause a transmission of a signal to connected mode user equipment devices that indicates that services currently being used by the user equipment may be halted, or suspended, during a NES period.

However, for idle mode user equipment, before a user equipment connects to a RAN node, the RAN node is not aware of location(s) of user equipment or target services or QoS profiles that the user equipment may pursue/request. This may lead to an idle mode user equipment connecting to a RAN node that has activated a NES mode that has halted the offering of, or support of, all of, or some of, services or QoS profiles to be targeted by, pursued by, or requested by, the user equipment. This may result in an idle mode user equipment discarding processed connection establishment signaling information and transitioning back to idle mode in order to re-select another cell that may be offering services or QoS profiles targeted by the UE, and then attempting a random access and connection establishment procedure on a re-selected cell/RAN. Due to this repetitive and reactive user equipment device behavior, radio resources and battery charge are wasted at the user equipment due to fruitless random access and connection establishment procedures with one or more RAN nodes that may have activated NES mode operations.

Accordingly, to avoid resource and energy waste from user equipment attempting to connect to a RAN node that has activated a NES mode and that is not supporting services that the user equipment may request, while still fulfilling NES objectives (e.g., power saving at the RAN) embodiments are disclosed herein that facilitate dynamic cell/RAN re-selection procedures based on activated NES modes among one or more cell/RAN nodes. In embodiments disclosed herein, a RAN node may proactively declare a NES setup configuration, corresponding to a NES mode that the RAN has implemented, indicating one or more services or radio functions that the RAN node may have halted. According to embodiments disclosed herein, idle mode user equipment devices may efficiently camp on a given cell/RAN and then re-select another cell/RAN node that currently offers a service or function that the user equipment needs, thus avoiding wasting signaling overhead and incurring delay of performing connection establishment with a cell/RAN that is not currently offering a target service or target function (e.g., a service or function needed by the user equipment). Embodiments disclosed herein may modify currently-used idle mode signaling flows with new and novel radio information elements and may implement one or more new triggering conditions for an idle user equipment device to perform cell re-selection based on a RAN node's NES condition, or configuration, instead of based on conventional coverage-based cell re-selection (e.g., instead of reselecting a cell/RAN from among multiple cells/RANs based on the user equipment determining a cell/RAN having a higher signal strength at the user equipment than other cells/RANs).

Dynamic cell reselection triggered by network energy saving mode.

Embodiments disclosed herein facilitate triggering reselection of a cell/RAN based on an NES mode at a currently-selected cell/RAN. As discussed above, existing cell re-selection procedures are based on coverage levels/signal strength levels. If a coverage level of a currently-selected cell/RAN falls below a threshold or falls below a coverage level detected from another adjacent cell/RAN, cell/RAN re-selection is typically implemented. Basing a RAN re-selection determination solely on signal strength may disregard a NES state, or NES mode, that the currently selected RAN may have activated, during which NES mode the RAN may not be offering a service or QoS profile needed, or desired, by a user equipment that may be initiating, or that may be in the process of initiating, a connection to the NES RAN. A user equipment selecting and connecting to a RAN with excellent coverage cell/determined signal strength, but that is not offering desired services, is useless from the user equipment's perspective.

Using embodiments disclosed herein, an NES-mode-active cell/RAN node may proactively declare a current NES setup configurations toward idle mode user equipment devices as part of idle mode signaling (e.g., as part of a system information block ("SIB") according to current procedures or via a novel dedicated SIB disclosed herein). A declared NES configuration may comprise: an indication of an active period of a current NES mode; one or more (e.g., a list of) service identifiers, QoS identifiers, or quality class indication ("QCI") identifiers, corresponding to services, quality-of-service, or quality classes, respectively, that will not be offered, or that are not offered, during the indicated active period of current NES configurations; and a list of neighboring cell/RAN identifiers corresponding to other cell/RAN nodes that are alternatively offering the services, quality-of-service, or quality classes, not being offered by the currently-selected RAN during the currently-selected RAN's activated NES mode period. Based on the first two NES setup information elements (e.g., an NES mode period indication and list or services/QoS/QCIs) an idle mode user equipment becomes able to identify whether a currently-selected cell/RAN is appropriate for subsequent random access and connection establishment or not, by determining whether the currently-selected cell is offering target services, QoS profiles, or quality classes. If a currently-selected cell is deemed not appropriate to offer target services, an idle mode user equipment device may trigger a cell re-selection procedure, based on the third information element of the NES setup configurations (e.g., based on the list of alternative RAN nodes that are offering the targeted services/QoS/quality classes).

In an example, an idle mode user equipment device, based on receiving the list of cell identifiers corresponding to RAN nodes that currently support targeted services, may initiate cell re-selection towards a RAN, which may be indicated via a message from a currently-selected RAN, as an alternative RAN (in an embodiment, if the user equipment deems coverage level of the alternative RAN sufficient to facilitate wireless communication with the alternative RAN), without the need for receiving and decoding a NES setup configuration corresponding to the alternative RAN. In other words, regardless of a NES mode (if any) of the alternative RAN, the idle mode user equipment device has become aware that services targeted/desired/request by the idle mode user equipment that have been halted by the currently-selected RAN are available, supported, or offered by the alternative RAN, based on information received via signaling from the currently-selected RAN. Thus, a RAN can utilize the energy saving gain of NES procedures while idle mode user equipment devices can avoid, or minimize, connecting to cells/RANs that are not currently serving the idle mode user equipment's target/desired services.

An initial act of a NES-triggered cell reselection embodiment disclosed herein may comprise adjacent cells/RAN nodes exchanging their respective NES configurations, including a listing of services, traffic priority identifiers, flow identifiers, or quality class indication identifiers, corresponding to services, priorities, flows, or quality classes that will not be supported when, or if, the respective RAN nodes activate respective NES modes. Such exchanging of respective NES mode configurations between cells/RAN nodes that are adjacent, or nearby one another (e.g., within a determined or configured distance), facilitates a cell/RAN node, to which an idle mode user equipment may have selected as its currently-selected cell/RAN to camp on, apprise the idle mode user equipment of one or more identifier indications indicative of one or more alternative cells/RAN nodes that may be offering services, priorities, quality classes, etc. that the currently-selected cell/RAN is not currently supporting. Thus, idle mode devices may be efficiently guided to re-select a cell/RAN that is offering a service targeted by the idle mode user equipment, instead of the idle mode user equipment reselecting a cell/RAN to potentially offer the service not being currently offered by the currently-selected cell/RAN based on a coverage level or signal strength determined by the idle mode user equipment.

Figure 2:
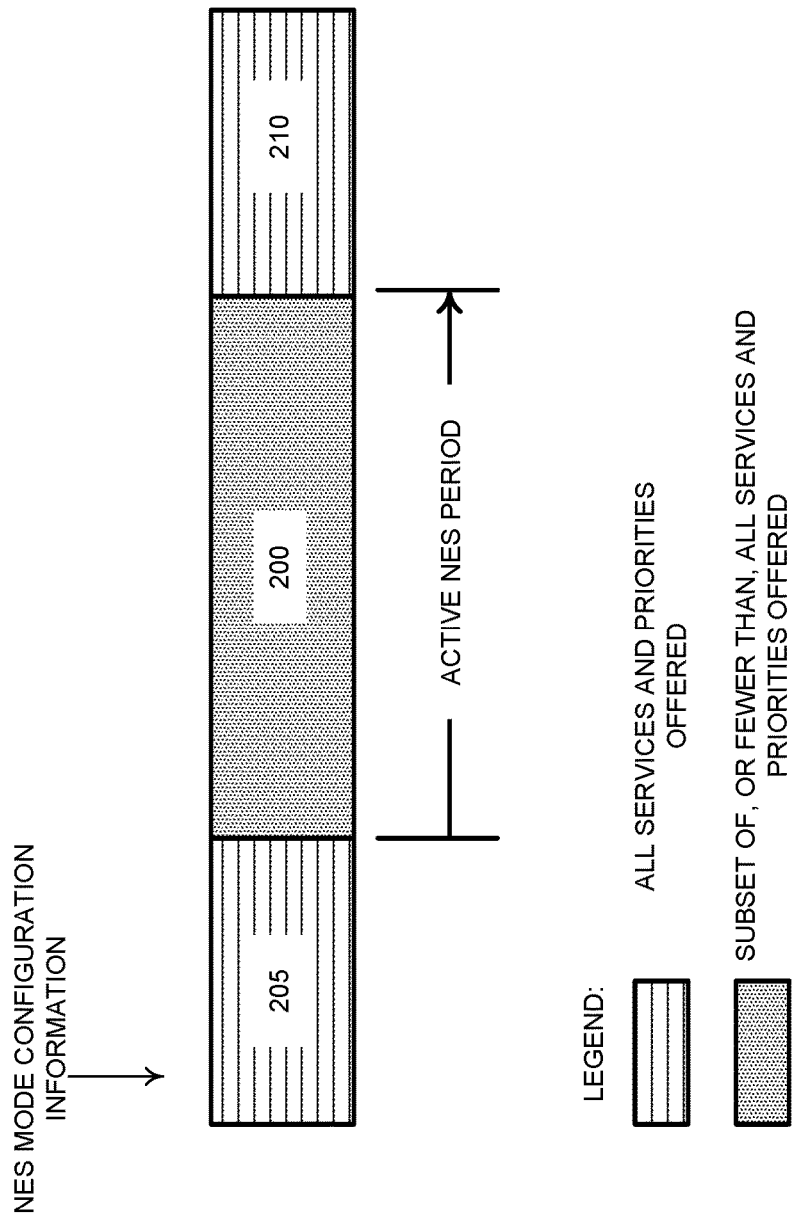
FIG. 2 illustrates an example inter-cell coordination embodiment of exchanging network energy saving service support information.

FIG. 2 illustrates an example NES mode period 200 between a preceding non-NES mode period 205 and a succeeding non-NES mode period 210. A user equipment may receive NES configuration information corresponding to a currently-selected (by the user equipment) RAN during non-NES mode period 205. The currently-selected RAN implementing NES mode period 200 may offer a configured suite of services, quality classes, flow types, qualities-of-service, and the like during non-NES modes 205 or 210. During NES mode period 200, the RAN node may halt offering of, or supporting of, some of, or all of, the services, quality classes, flow types, qualities-of-service, and the like that the RAN offers during periods 205 or 210.

Figure 3:
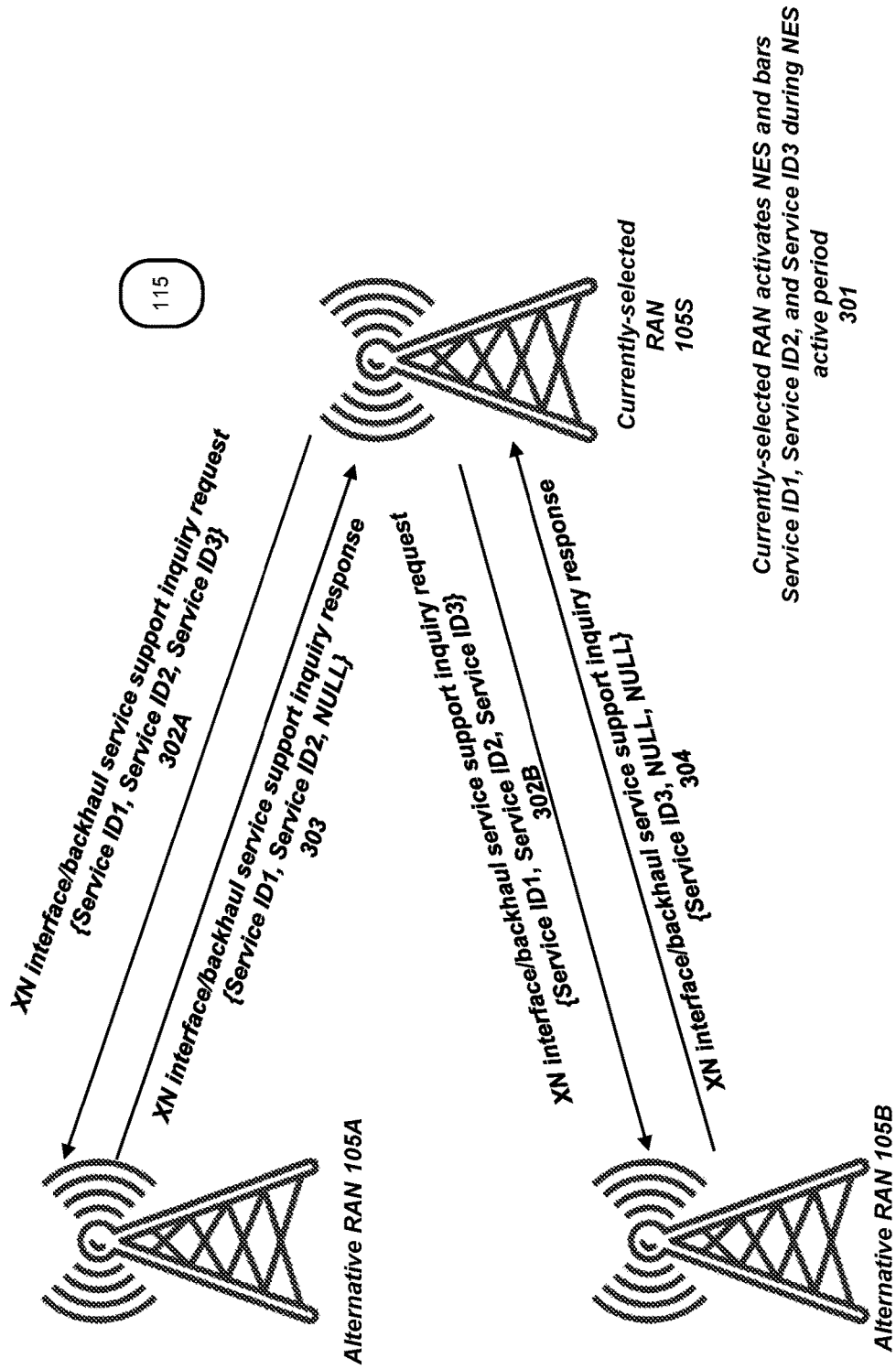
FIG. 3 illustrates an example network energy saving mode configuration to be used by a user equipment in an idle mode.

FIG. 3 illustrates an environment 300 in which a first cell/RAN 105S, which may be referred to as a source cell/RAN or as a currently-selected RAN, activates a NES mode at act 301. RAN 105S may determine one or more services or quality classes that will be temporarily deactivated, or halted, during the NES active period, such as period 200 shown in FIG. 2. Continuing with description of FIG. 3, source RAN 105S may inquire, via request messages 302A or 302B, of adjacent alternative cells/RANs 105A and 105B, respectively, whether the alternative RANs may be offering the services or quality classes during activated NES modes of the alternative RANs. Requests 302A and 302B may be referred to as requests for services-active indications that are indicative of one or more services, quality classes, flows, etc., that may be offered by one or more of alternative RAN 105A or alternative RAN 105B during active NES modes at the alternative RANs (it will be appreciated that the alternative RANs typically would not block, not halt, or otherwise not offer services, qualities, etc. during non-NES periods corresponding to the alternative RANs, such as periods 205 or 210 shown in FIG. 2). It will be appreciated that messages 302A and 302B may be transmitted to RANs 105A and 105B, respectively, simultaneously or substantially simultaneously, or at different times. Alternative RANs 105A or 105B may transmit to currently-selected RAN 105S respective services-active messages 303 or 304 comprising respective services-active indications indicative of the respective alternative RAN nodes actively providing a service that may be at least one service that may be halted during the NES mode period, or inactive state period, at RAN 105S. Services-active indication messages 303 and 304 may themselves comprise requests for services-active indications. Although not shown in FIG. 3 for purposes of clarity, it will be appreciated that RAN nodes 105A and 105B may also exchange requests for services-active indication messages 302A and 302B and services-active messages 303 and 304, that the sequence of transmitting of messaging signals 302A, 302B, 303, and 304 may occur in a different order than described above, and that the reference numbers 302A, 302B, 303, and 304 are not meant to necessarily indicate an order. By exchanging services-active indication messages 302A and 302B, and services-active messages 303 and 304, RAN 105S can guide idle mode device 115 to reselect an alternative RAN 105A or 105B during an active NES mode at RAN 105S if the idle mode user equipment is interested in, requests, or needs, a service offered by one of the alternative RANs during an active NES period at RAN 105S.

Thus, source cell/RAN 105S may transmit a service support inquiry request 302 (e.g., request message 302A or 302B), which may be referred to as a services-active indication message, towards adjacent cells 105A and 105B, respectively, via an XN interface, or via backhaul links through core network 130 (shown in FIG. 1). The service support inquiry request 302 may comprise a list of service IDs, or QCI IDs. Adjacent alternative cells/RANs 105A or 105B, responsive to messages 302A or 302B, respectively, may transmit inquiry response messages 303 or 304, respectively, which may be referred to as service-active indication messages, and which may comprise service identifiers or QCI identifiers, indicated in inquiry request message 302, that the alternative RAN nodes are currently supporting. It will be appreciated that such current support may be offered during a non-NES mode period at either of the alternative RAN nodes 105A or 105B or during a NES mode period at either of the alternative RAN nodes. Based on a received inquiry response message 303 or 304, source RAN 105S may determine which adjacent cell 105A or 105B will be offering services or QoS classes which RAN 105S will be deactivating during its NES mode period.

As shown in FIG. 4A and FIG. 4B, a benefit of cell/RAN re-selection embodiments disclosed herein is that user equipment devices avoid connecting to a cell/RAN that is not offering a service targeted by the user equipment. Thus, energy use reduction may be achieved at both one or more RAN nodes and at user equipment due to avoiding unnecessary connection establishment signaling, which will be flushed when user equipment become aware that target services/classes are not support by a RAN to which the user equipment may have just connected.

As shown in FIG. 4A, according to reselection process 400A, which does not include NES-mode-driven cell reselection as disclosed herein, user equipment devices may reselect a cell during reselection period 405A during an idle mode period 410A based on the best received coverage level (e.g., a signal strength corresponding to a RAN as determined by the user equipment). Thus, when there is a payload arrival, (e.g., at the RAN (re)selected by the idle user equipment during period 405A), that is indicated during a paging occasion monitored by the user equipment during idle period 410A, the user equipment device attempts to initiate connecting to the already-selected, or currently-selected, cell/RAN, and is then made aware, during a power-heavy and overhead-heavy RRC connection establishment signaling procedure during connection period 415A, that the services that are targeted for use by the user equipment are not currently supported by the currently-selected cell/RAN due to an active NES mode at the currently-selected cell/RANs. The user equipment flushes RRC connection signaling and configuration information, initiates cell/RAN re-selection, and selects the second-best cell based on the second best/highest received coverage level, or signal strength, during reselection period 420A. Reselection can be repeated during additional reselection periods if the second cell has also activated an NES mode and is also not offering a targeted service. Multiple reselection processes can increase traffic packet buffering delay and therefore can waste resources on fruitless connection establishment signaling. After selecting an alternative RAN, during period 420A, that is offering services that are not being offered by the RAN selected during period 405A, traffic transmission from the alternate RAN (re)selected during period 420A and connected to during period 425A occurs during period 430A. Thus, during procedure 400A, two connection procedures during respective connection periods 415A and 425A are performed by a user equipment to facilitate traffic transmission during period 430A In contrast, as depicted by scenario 400B shown in FIG. 4B, using an NES-mode-driven guided cell reselection embodiment disclosed herein, user equipment devices may become aware during idle mode period 410B of a NES-mode configuration of a currently-selected cell/RAN selected during 405B. During period 405B, the user equipment may receive an indication of one or more services that are not offered during an active NES-mode period of the currently-selected. The indication received from the currently-selected RAN selected during period 405B may include an indication of adjacent cells/RANs that are offering the same services (e.g., the indication may comprise one or more identifiers of one or more adjacent/alternative RANs that offer services that the currently selected RAN has halted, or will halt during a NES mode period). The user equipment, during idle mode period 410B, may then (re)select, during period 407B, an alternative RAN based on information received from the previously-selected RAN during period 405B. The user equipment may then perform a resource-intensive RRC connection with the alternative RAN during connection period 425B and receive traffic during period 430B from the alternative RAN. Although the RRC connection procedure performed during connection period 425B may be resource intensive (e.g., the procedure takes time and user battery power of the user equipment and power at the RAN to which the user equipment is connecting), compared to the two connection periods 415A and 425A of procedure 400A, there is only one connection procedure 425B performed according to procedure 400B.

In an example, with an industrial machine-to-machine ("M2M") user equipment device deployment, traffic arrival may be periodic and thus can be determined without indication from a RAN that the traffic has arrived at the RAN for transmission to the M2M user equipment. An M2M user equipment device can determine if a halting of services at a currently-selected cell/RAN would negatively impact operation of the M2Md user equipment and thus determine that the M2M user equipment should not proceed with cell connection to the currently-selected cell/RAN if doing so to obtain a halted service would occur during the currently-selected RAN's NES period. Instead of basing cell/RAN re-selection solely upon a determined coverage level, an NES-driven guided cell re-selection embodiment may facilitate an M2M user equipment device determining nearby alternative cell/RAN nodes based on cell/RAN identifiers of RAN nodes currently offering services targeted by the M2M user equipment, based on novel NES-mode message signaling, as disclosed herein, while facilitating a reasonably good coverage level. Thus, in an M2M user equipment scenario, a guided, and early (e.g., before payload packet arrival at a RAN for transmission to the user equipment) cell/RAN re-selection may be implemented, which may facilitate faster traffic transmissions and avoidance of 'ping-pong' cell connection/reselection operations.

Figure 5:
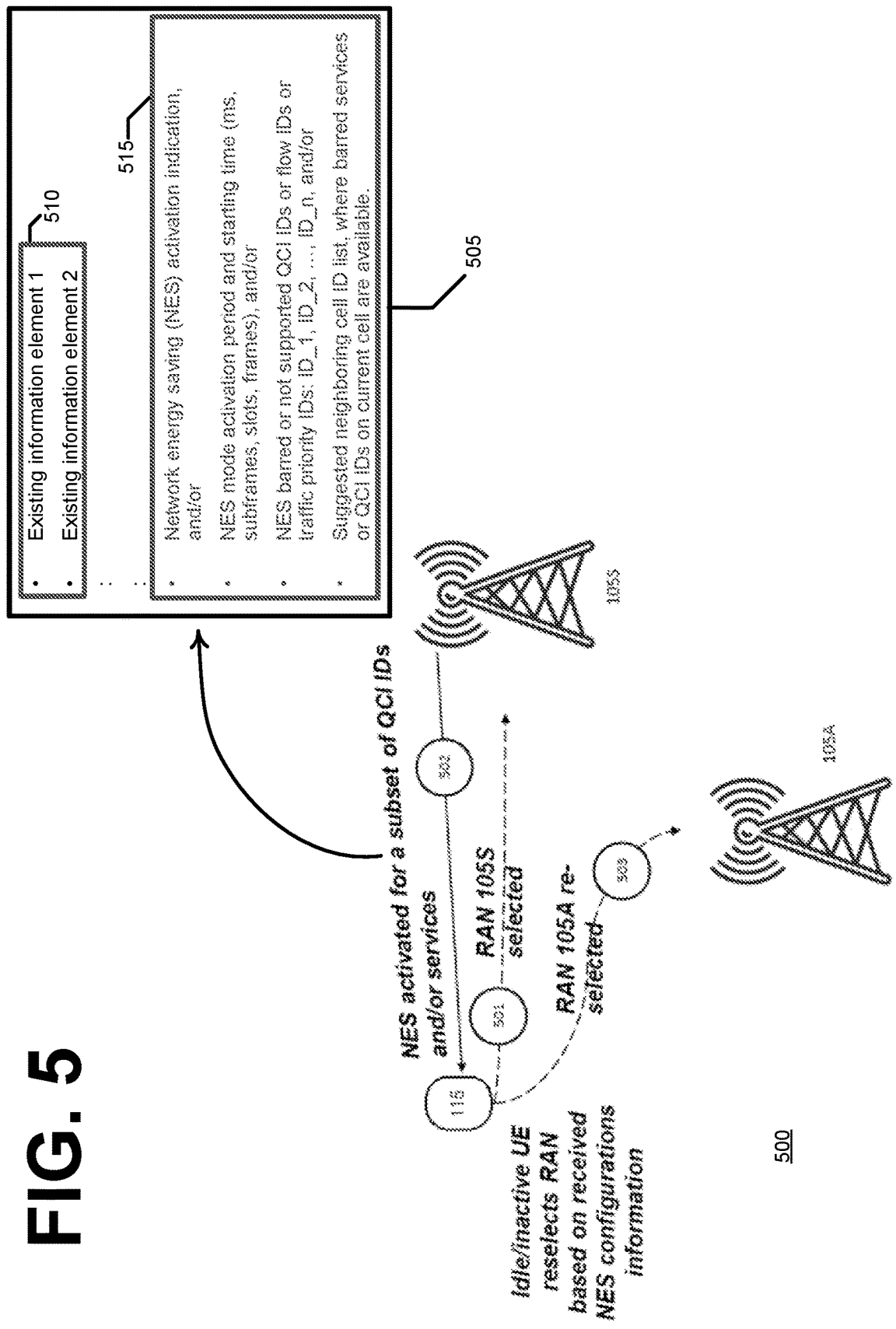
FIG. 5 illustrates a radio access network node reselection procedure based on an energy saving mode message.

In FIG. 5, environment 500 illustrates an example overall flow of signaling and network-device actions. At act 501, idle mode device 115 may select RAN 105S according to coverage-based selection criteria, (e.g., select a RAN corresponding to a highest detected received coverage level). Next, at act 502, idle mode user equipment 115 receives a current NES-mode configuration indication via signaling from the selected cell, either as part of existing SIB signaling or as part of a dedicated, NES SIB transmission. Next, based on a received NES-mode setup configuration, idle mode user equipment 115 determines whether one or more targeted/desired services or QoS profiles are currently served by selected RAN 115S. If not, idle mode user equipment 115 may trigger, at act 503, cell/RAN re-selection. As part of guided NES-mode cell/RAN reselection, UE 115 may overwrite conventional coverage-based cell re-selection configuration information based on a cell/RAN identifier that may have been received at act 502 as part of an NES-mode setup configuration message 505. Information contained in message 505 may guide idle mode user equipment 115 to attempt receiving and decoding RRC connection information corresponding to re-selected cell/RAN 105A, thus reducing, or eliminating, consuming battery power at UE 115 in attempting re-selection of a cell/RAN that may not be supporting a service for which RAN 105S may have halted support.

RAN 105S, which may have activated NES mode for all of, or a subset of, normally offered radio functions or services may transmit a NES setup configuration message 505 towards idle mode user equipment devices 115, which NES setup configuration message may comprise existing information elements 510 and new information elements 515. New information elements 515 may facilitate embodiments disclosed herein and may comprise an NES-mode activation indication indicative of activating of an NES mode at RAN 105S, or an NES mode period indication indicative of a period over which the indicated NES-mode will remain valid, or be in effect. The NES mode period can be configured in terms of milliseconds, frames, superframes, or slots, for example. New information elements 515 in NES setup configuration message 505 may comprise a list of one or more service identifiers, QCI identifiers, QoS profile identifiers, or traffic priority identifiers, corresponding to services, quality classes, qualities of service profiles, traffic priorities, respectively, that may be barred/not supported during the NES-mode period of which the NES-mode indicated by message 505 is active. New information elements 515 of message 505 may comprise a list of one or more cell/RAN identifiers, including an identifier corresponding to RAN 105A, that may be indicative of neighboring cells/RANs that are currently offering or supporting one or more of the services, quality classes, qualities of service profiles, or traffic priorities, indicated in message information elements 515. Message 505 may be part of existing master information block (MIB) transmissions, SIB1 blocks, or SIBx blocks. However, in an embodiment, message 505 may be carried by a dedicated new SIB block transmission message that is targeted only towards future user equipment device implementations supporting cell re-selection based on NES configurations.

Therefore, from the RAN node perspective, and as shown by FIG. 2 during non-NES active periods 205 and 210, normally supported services and radio functions may be supported by RAN 105S shown in FIG. 5. However, during the NES-mode period 200, RAN 105S may halt, or suspend, supporting of one or more of the radio services and/or functionalities to facilitate energy saving. Moreover, during NES active period 200, idle mode user equipment 115 may become aware, via message new information elements 515, of services or QoS profiles that will not be offered by RAN 105S if a connection with the currently-selected cell/RAN 105S is established.

Figure 6:
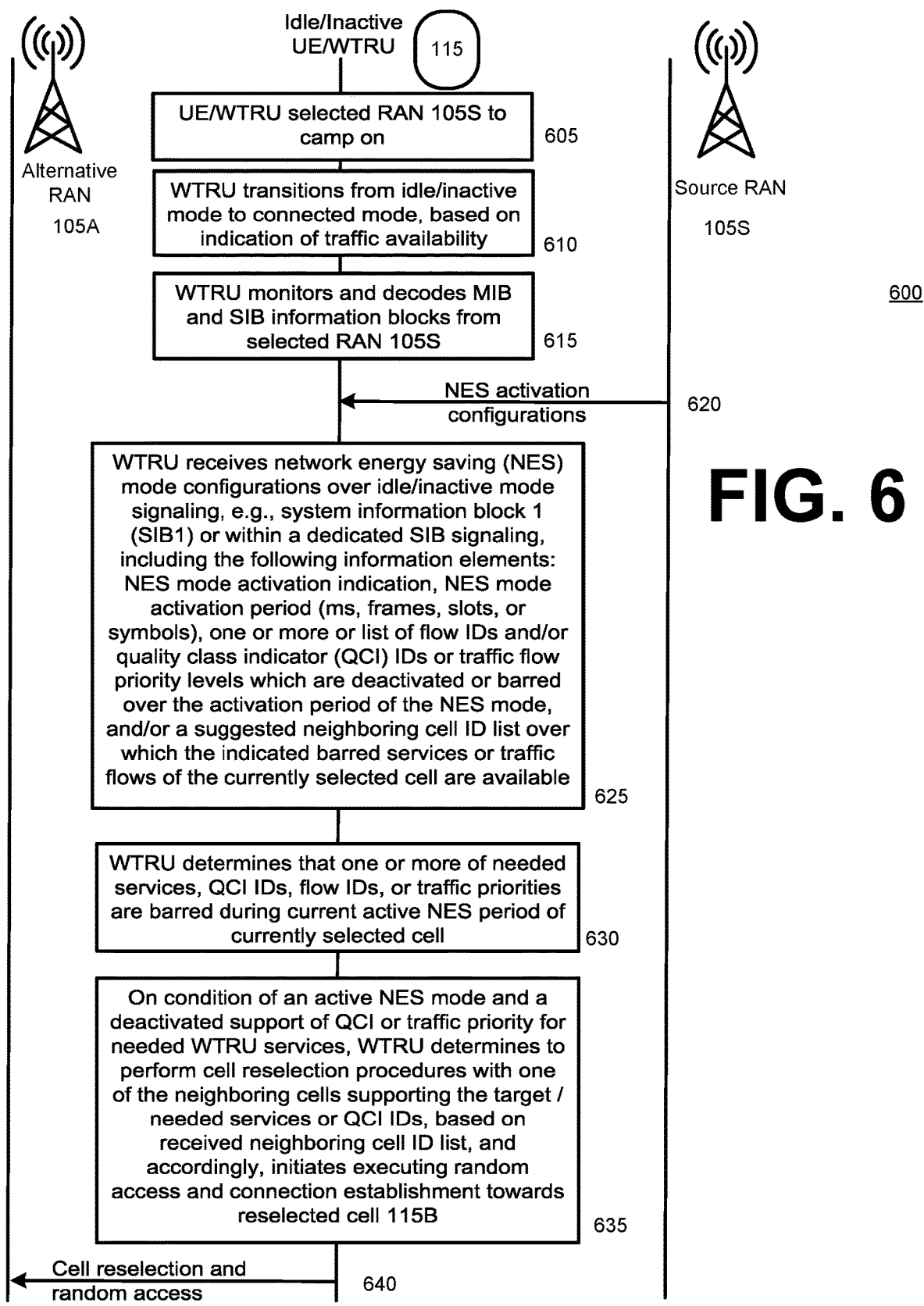
FIG. 6 illustrates timing diagram of an example embodiment method to reselect a radio access network node when a currently-selected radio access network node does not actively support a service to be requested by a user equipment.

Turning now to FIG. 6, the figure illustrates a timing diagram of a method 600 to facilitate notifying, by first RAN node 105S, which may be referred to as a source RAN node, UE 115 that second RAN node 105A, which may be referred to as an alternative RAN node, currently supports a service that is, or will be, inactive at the source RAN node during an NES mode period corresponding to the source RAN node.

At act 605, idle, or inactive, UE/WTRU 115 may select RAN 105S as a RAN node to camp on until the user equipment receives at act 610 a traffic-available indication indicative of traffic that is available for transmission to the user equipment. At act 615, the UE/WTRU may monitor and decode MIB and SIB information blocks transmitted by RAN 105S. At act 620, user equipment 115 may receive, or retrieve from the information blocks monitored and decoded at act 615, network energy saving mode configuration information via idle/inactive mode signaling, (e.g., a system information block 1 (SIB1) message or within a dedicated SIB signaling message). The NES mode configuration information may comprise the following information elements: an NES mode activation indication indicative of RAN 105S activating an NES mode; an NES mode activation period (e.g., in terms of milliseconds, frames, slots, symbols, or the like), one or more identifiers of traffic flows, quality class indicator identifiers, traffic flow priority levels that are, or will be, deactivated or barred during the activated NES mode period, or an indication of, or an identifier corresponding to, one or more suggested neighboring cell/RAN nodes that will offer, make available, support, or otherwise facilitate the services or traffic flows of the currently selected cell that are indicated as being barred, halted, deactivated, or otherwise unavailable from the currently selected RAN 115S.

UE/WTRU 115 may determine that a service, flow, quality, etc. that the UE/WTRU may request is active from RAN 105S. Based on an indication that during the activated NES mode at RAN 105S, as indicated in NES mode configuration information received at act 625 and based on a service, QCI, or traffic priority for service or priorities desired by UE/WTRU 115 being available at RAN 105S during the NES mode at RAN 105S, the UE/WTRU may initiate random access and connection establishment with RAN 105S.

However, on condition of determining, at act 630, an active NES mode at RAN 105S and an indication of deactivated support at RAN 105S of a service, a QCI, or a traffic priority, etc., desired by UE/WTRU 115, the UE/WTRU may, at act 635, trigger and perform cell reselection with RAN 105A based on an indication (e.g., a listing of identifiers corresponding to one or more neighboring/adjacent cells/RANs that will supporting the service, quality, priority, etc. that will be inactive during NES mode at RAN 105S) included in the NES mode configuration information received at act 625, that RAN 105A will be supporting the targeted services, quality, priority that will be inactive at RAN 115S. At act 640, UE 115 performs random access and connection establishment with RAN 105A.

In an embodiment, an active NES mode at RAN 105S, RAN 105S may decline or reject accepting, or establishing, new UE/WTR connection requests from user equipment that may request one or more deactivated services, QCI IDs, traffic priority IDs, or flow IDs during the active NES period corresponding to source RAN 105S.

Figure 7:
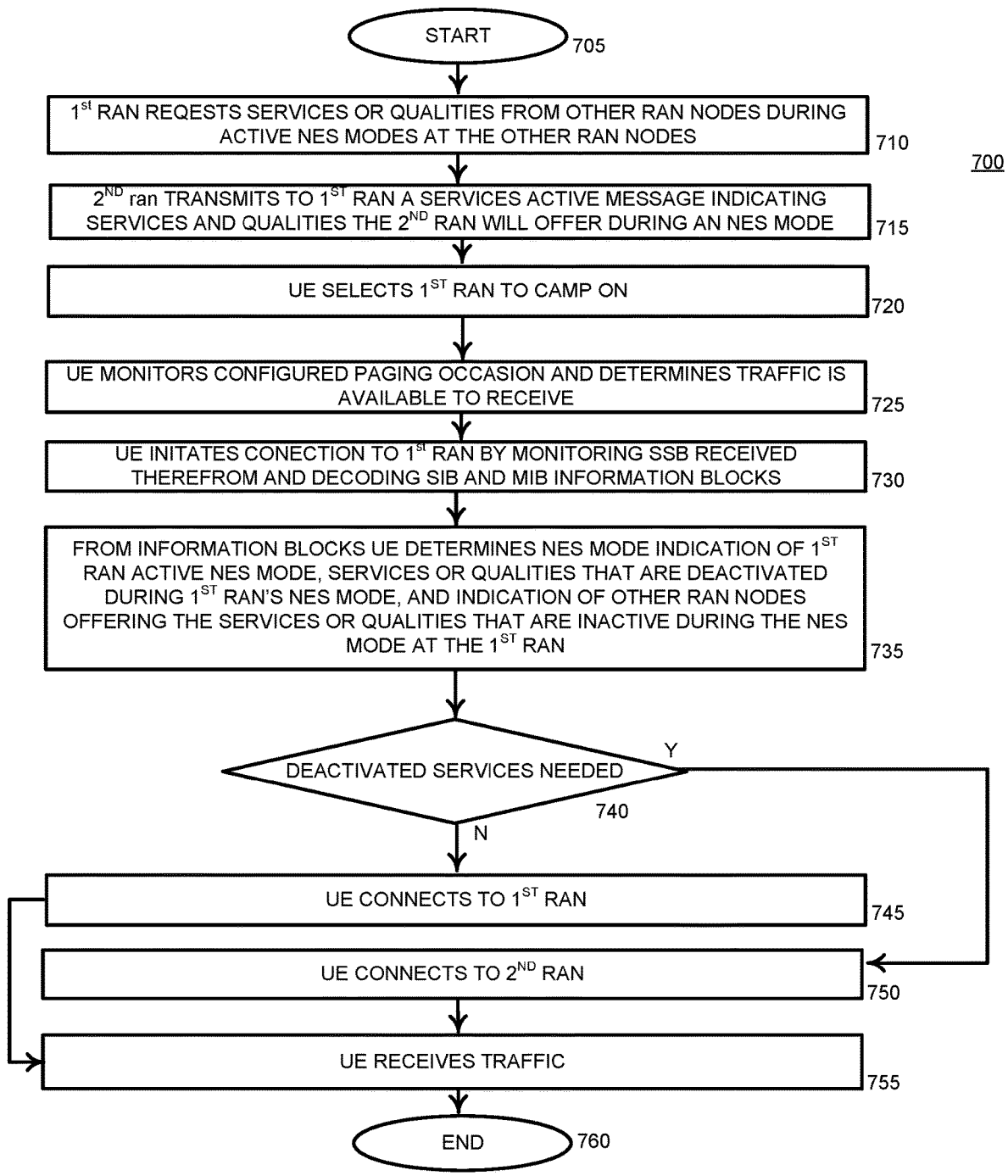
FIG. 7 illustrates flow diagram of an example embodiment method to reselect a radio access network node when a currently-selected radio access network node does not actively support a service to be requested by a user equipment.

Turning now to FIG. 7, the figure illustrates a flow diagram of an example embodiment method 700 to facilitate a user equipment in re-selecting a second, or alternative, RAN node to which to connect to receive traffic without the user equipment fully connecting to a first RAN node currently selected by the UE. The first RAN and second RAN may be within a long-range wireless range of the user equipment such that both can provide adequate signal strength, as determined by the user equipment, for uplink and downlink traffic transmission.

Method 700 begins at act 705. At act 710, the first RAN requests an identification or indication of services, priorities, flows, or qualities that may be provided by other RAN nodes that are within a proximity of the first RAN node, such that the other RAN nodes may likely be within a satisfactory coverage range of a user equipment that may also be in a satisfactory coverage range of the first RAN node. At act 715, responsive to the request that was transmitted from the first RAN node at act 710, a second RAN node may transmit to the first RAN node a services active message that may indicate services, priorities, flows, or qualities that the second RAN node may offer during an NES mode at the second RAN node, when, or if, an NES mode is implemented at the second RAN node. It will be appreciated that when the second RAN node is not in an NES mode, the second RAN node is presumed to offer, or support, all services or qualities that the first RAN node may offer or support while the first RAN node is not in an NES mode.

At act 720, the user equipment may select the first RAN node as a RAN node of multiple RAN nodes that may be within a range of the user equipment such that adequate uplink and downlink transmission with the user equipment may be achieved, based on the first RAN node having a highest signal strength of the multiple RAN nodes, as determined by the user equipment. The user equipment may 'camp' on the first RAN node (e.g., select, and maintain the selection of, the first RAN node) while in an idle mode or while in an inactive mode. At act 725, the user equipment may monitor a configured paging occasion and determine from information detected or decoded from a paging message received from the first RAN node during the paging occasion that traffic from a core network (e.g., core network 130 shown in FIG. 1) is available for transmission to the user equipment.

Continuing with description of FIG. 7, at act 730, the user equipment initiates connection to the first RAN node, which the user equipment is camped on, by monitoring synchronization signal block signaling received from the first RAN node, and decodes master information block information and system information block information from information transmitted from the first RAN node via the synchronization signal block signaling. The system information block information may comprise system information block 1 (SIB1) information. At act 735, from information contained in the information blocks received and decoded at act 730, the user equipment determines that the first RAN node may be about to activate, or may have activated, an NES mode and that certain services or qualities have been deactivated by the first RAN node during the activated, or soon-to-be-activated, NES mode. An indication received from the first RAN node may comprise an indication of other RAN nodes that may be offering services or qualities that are inactive during the NES mode at the first RAN node. It will be appreciated that currently, system information block information does not comprise information of a RAN node other than information corresponding to the RAN node that transmitted a synchronization signal block that contains the system information block information.

At act 740, the user equipment determines whether one or more services, one or more qualities, one or more flows, etc., that will be deactivated during the NES mode of the first RAN node are needed, or will be requested, by the user equipment, for example to facilitate receiving of the traffic indicated at act 725. If a determination made at act 740 is yes, that one or more services or qualities needed by the user equipment will be inactive, or otherwise not supported or offered by the first RAN node during an active NES mode at the first RAN node, the user equipment may execute an RRC connection procedure with the second RAN node at act 750. After connecting with the second RAN node at act 750, the user equipment may receive, at act 755, from the second RAN, facilitated by one or more services or qualities that are deactivated at the first RAN, the traffic that was indicated as being available at act 725. Method 700 advances to act 760 and ends.

Returning to description of act 740, if a determination is made at act 740 that a service or quality that is deactivated at the first RAN node is not needed by the user equipment, for example, is not needed to receive the traffic indicated as available at act 725, the user equipment may complete an RRC connection with the first RAN at act 745, notwithstanding that the first RAN node may have activated an NES mode, and receive at act 755 the traffic indicated as available at act 725, before method 700 advances to act 760 and ends.

Figure 8:
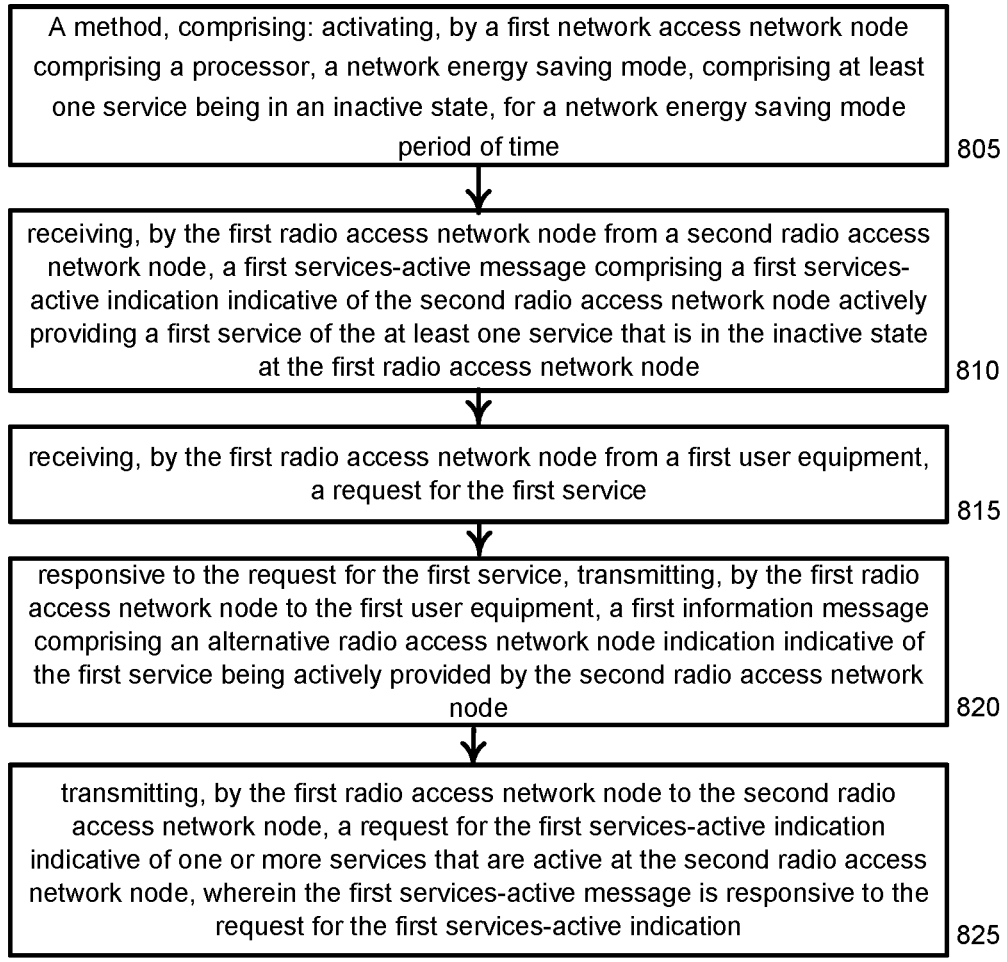
FIG. 8 illustrates a block diagram of an example method embodiment.

Turning now to FIG. 8, the figure illustrates an example embodiment method 800 comprising at block 805 activating, by a first network access network node comprising a processor, a network energy saving mode, comprising at least one service being in an inactive state, for a network energy saving mode period of time; at block 810 receiving, by the first radio access network node from a second radio access network node, a first services-active message comprising a first services-active indication indicative of the second radio access network node actively providing a first service of the at least one service that is in the inactive state at the first radio access network node; at block 815 receiving, by the first radio access network node from a first user equipment, a request for the first service; at block 820 responsive to the request for the first service, transmitting, by the first radio access network node to the first user equipment, a first information message comprising an alternative radio access network node indication indicative of the first service being actively provided by the second radio access network node; and at block 825 transmitting, by the first radio access network node to the second radio access network node, a request for the first services-active indication indicative of one or more services that are active at the second radio access network node, wherein the first services-active message is responsive to the request for the first services-active indication.

Figure 9:
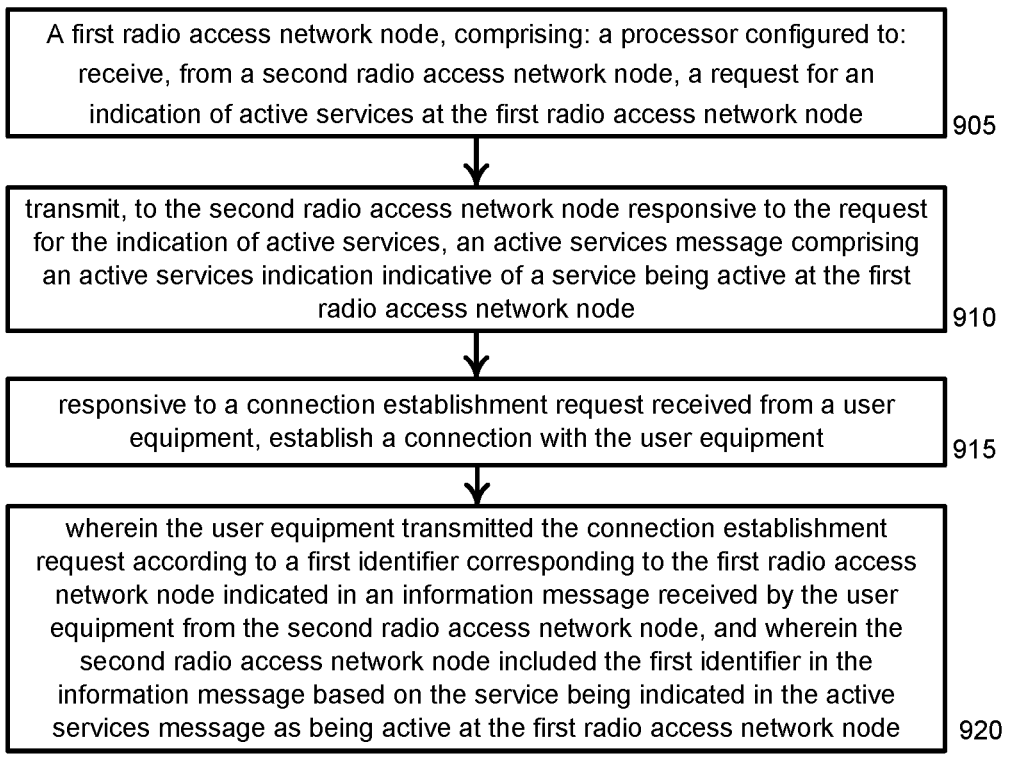
FIG. 9 illustrates a block diagram of an example radio access network node embodiment.

Turning now to FIG. 9, the figure illustrates an example first radio access network node, comprising at block 905 a processor configured to: receive, from a second radio access network node, a request for an indication of active services at the first radio access network node; at block 910 transmit, to the second radio access network node responsive to the request for the indication of active services, an active services message comprising an active services indication indicative of a service being active at the first radio access network node; at block 915 responsive to a connection establishment request received from a user equipment, establish a connection with the user equipment; and at block 920 wherein the user equipment transmitted the connection establishment request according to a first identifier corresponding to the first radio access network node indicated in an information message received by the user equipment from the second radio access network node, and wherein the second radio access network node included the first identifier in the information message based on the service being indicated in the active services message as being active at the first radio access network node.

Figure 10:
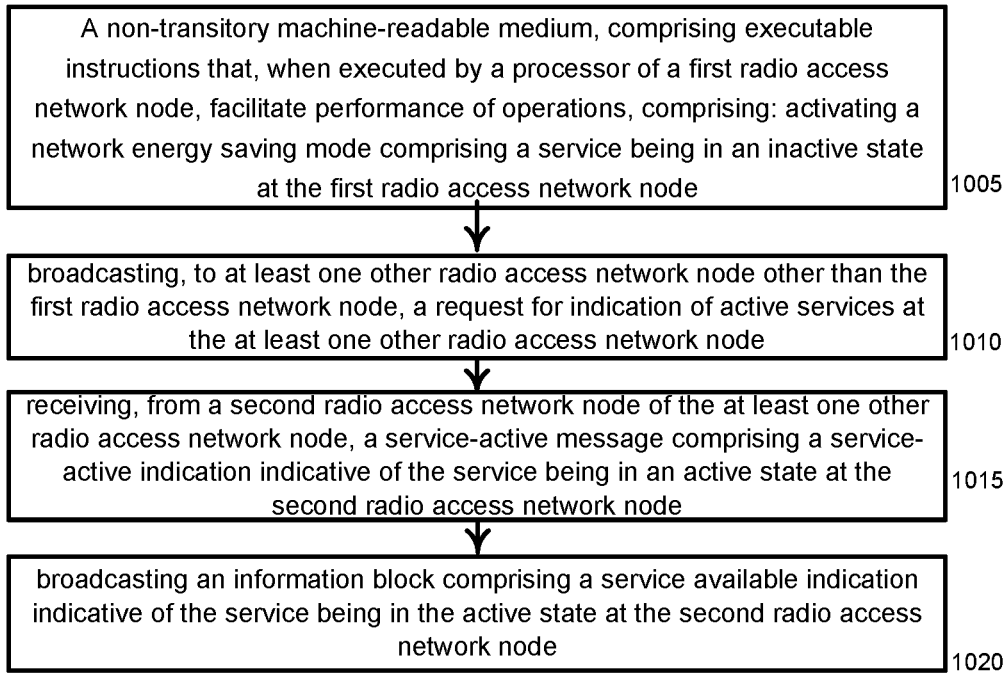
FIG. 10 illustrates a block diagram of an example non-transitory machine-readable medium embodiment.

Turning now to FIG. 10, the figure illustrates a non-transitory machine-readable medium 1000 comprising at block 1005 executable instructions that, when executed by a processor of a first radio access network node, facilitate performance of operations, comprising: activating a network energy saving mode comprising a service being in an inactive state at the first radio access network node; at block 1010 broadcasting, to at least one other radio access network node other than the first radio access network node, a request for indication of active services at the at least one other radio access network node; at block 1015 receiving, from a second radio access network node of the at least one other radio access network node, a service-active message comprising a service-active indication indicative of the service being in an active state at the second radio access network node; and at block 1020 broadcasting an information block comprising a service available indication indicative of the service being in the active state at the second radio access network node.

Figure 11:
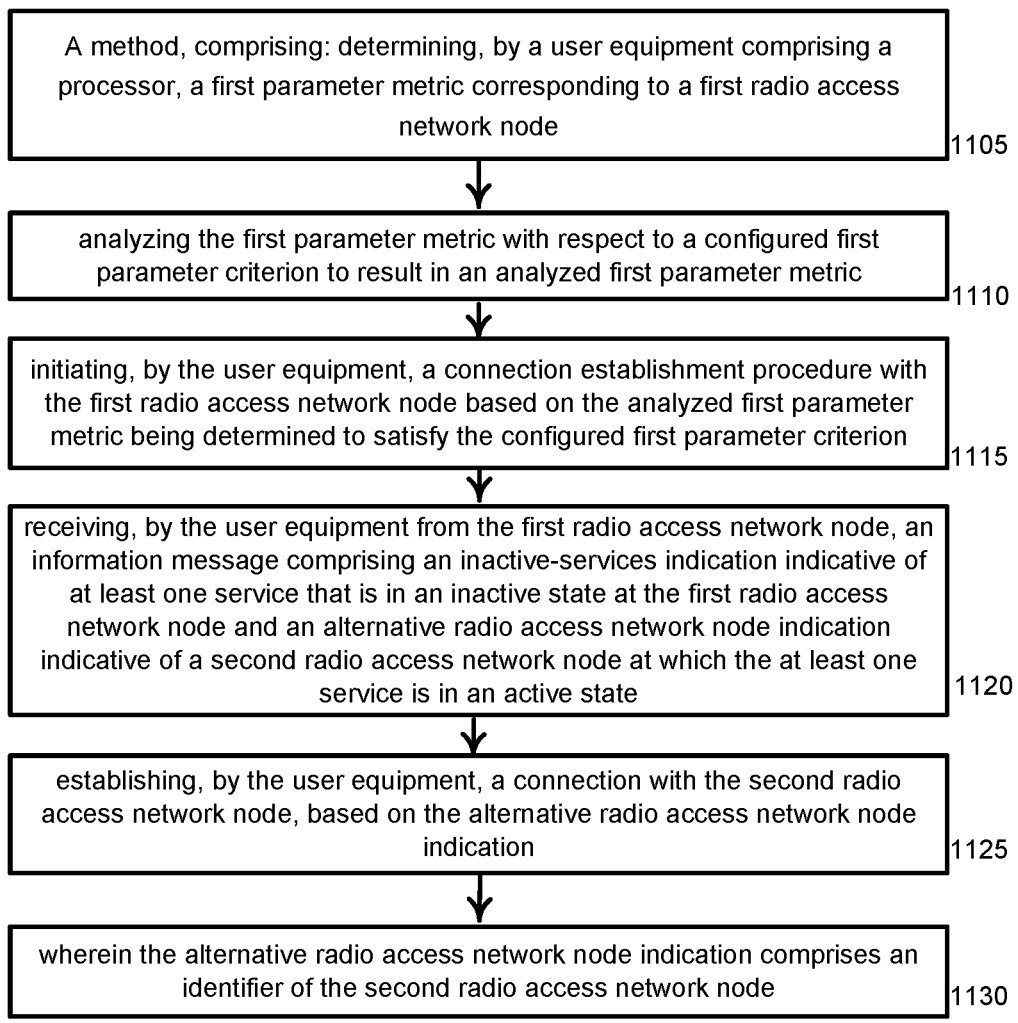
FIG. 11 illustrates a block diagram of an example method embodiment.

Turning now to FIG. 11, the figure illustrates an example embodiment method 1100 comprising at block 1105 determining, by a user equipment comprising a processor, a first parameter metric corresponding to a first radio access network node; at block 1110 analyzing the first parameter metric with respect to a configured first parameter criterion to result in an analyzed first parameter metric; at block 1115 initiating, by the user equipment, a connection establishment procedure with the first radio access network node based on the analyzed first parameter metric being determined to satisfy the configured first parameter criterion; at block 1120 receiving, by the user equipment from the first radio access network node, an information message comprising an inactive-services indication indicative of at least one service that is in an inactive state at the first radio access network node and an alternative radio access network node indication indicative of a second radio access network node at which the at least one service is in an active state; at block 1125 establishing, by the user equipment, a connection with the second radio access network node, based on the alternative radio access network node indication; and at block wherein the alternative radio access network node indication comprises an identifier of the second radio access network node.

Figure 12:
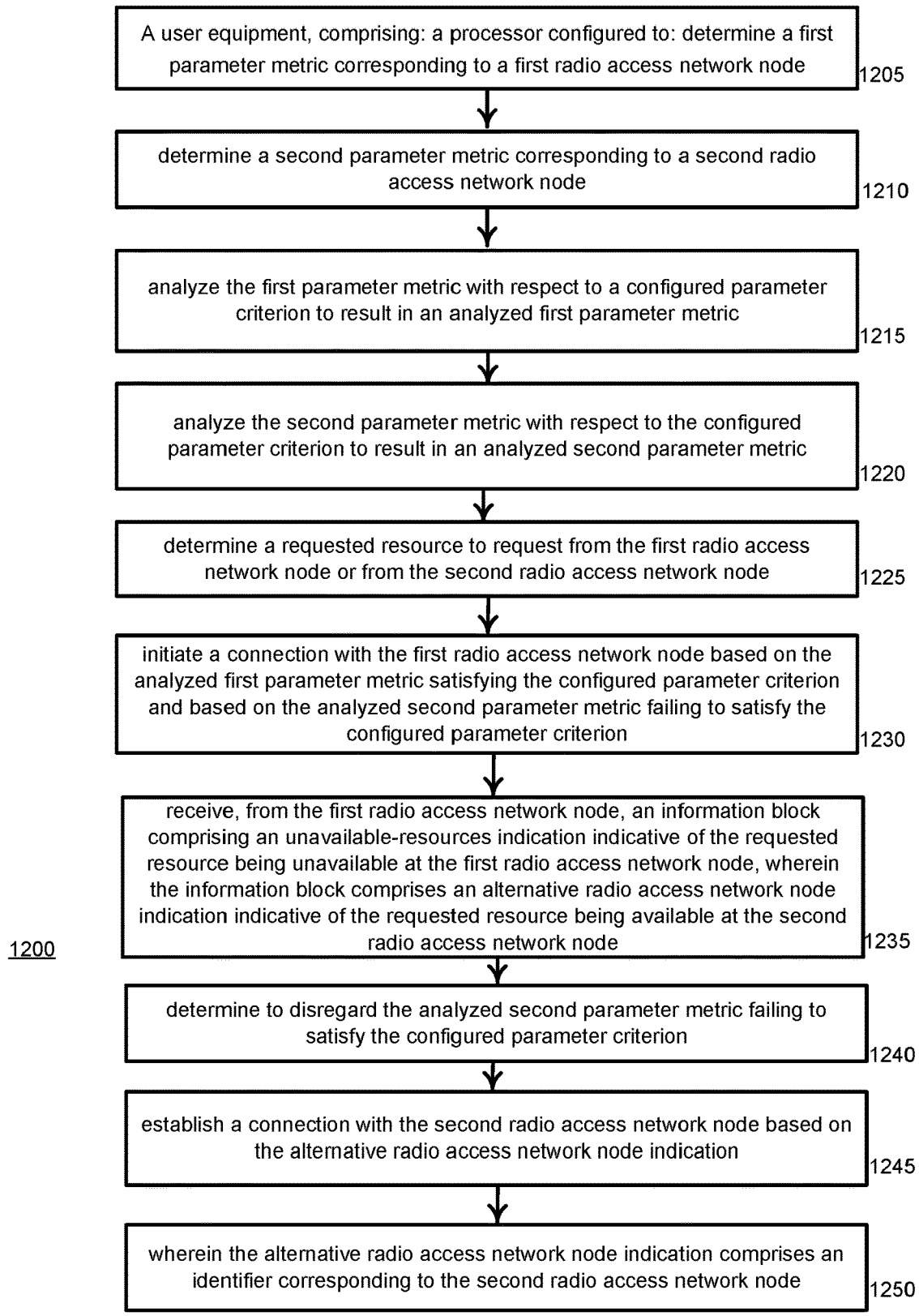
FIG. 12 illustrates a block diagram of an example user equipment embodiment.

Turning now to FIG. 12, the figure illustrates an example user equipment, comprising at block 1205 a processor configured to: determine a first parameter metric corresponding to a first radio access network node; at block 1210 determine a second parameter metric corresponding to a second radio access network node; at block 1215 analyze the first parameter metric with respect to a configured parameter criterion to result in an analyzed first parameter metric; at block 1220 analyze the second parameter metric with respect to the configured parameter criterion to result in an analyzed second parameter metric; at block 1225 determine a requested resource to request from the first radio access network node or from the second radio access network node; at block 1230 initiate a connection with the first radio access network node based on the analyzed first parameter metric satisfying the configured parameter criterion and based on the analyzed second parameter metric failing to satisfy the configured parameter criterion; at block 1235 receive, from the first radio access network node, an information block comprising an unavailable-resources indication indicative of the requested resource being unavailable at the first radio access network node, wherein the information block comprises an alternative radio access network node indication indicative of the requested resource being available at the second radio access network node; at block 1240 determine to disregard the analyzed second parameter metric failing to satisfy the configured parameter criterion; at block 1245 establish a connection with the second radio access network node based on the alternative radio access network node indication; and at block 1250 wherein the alternative radio access network node indication comprises an identifier corresponding to the second radio access network node.

Figure 13:
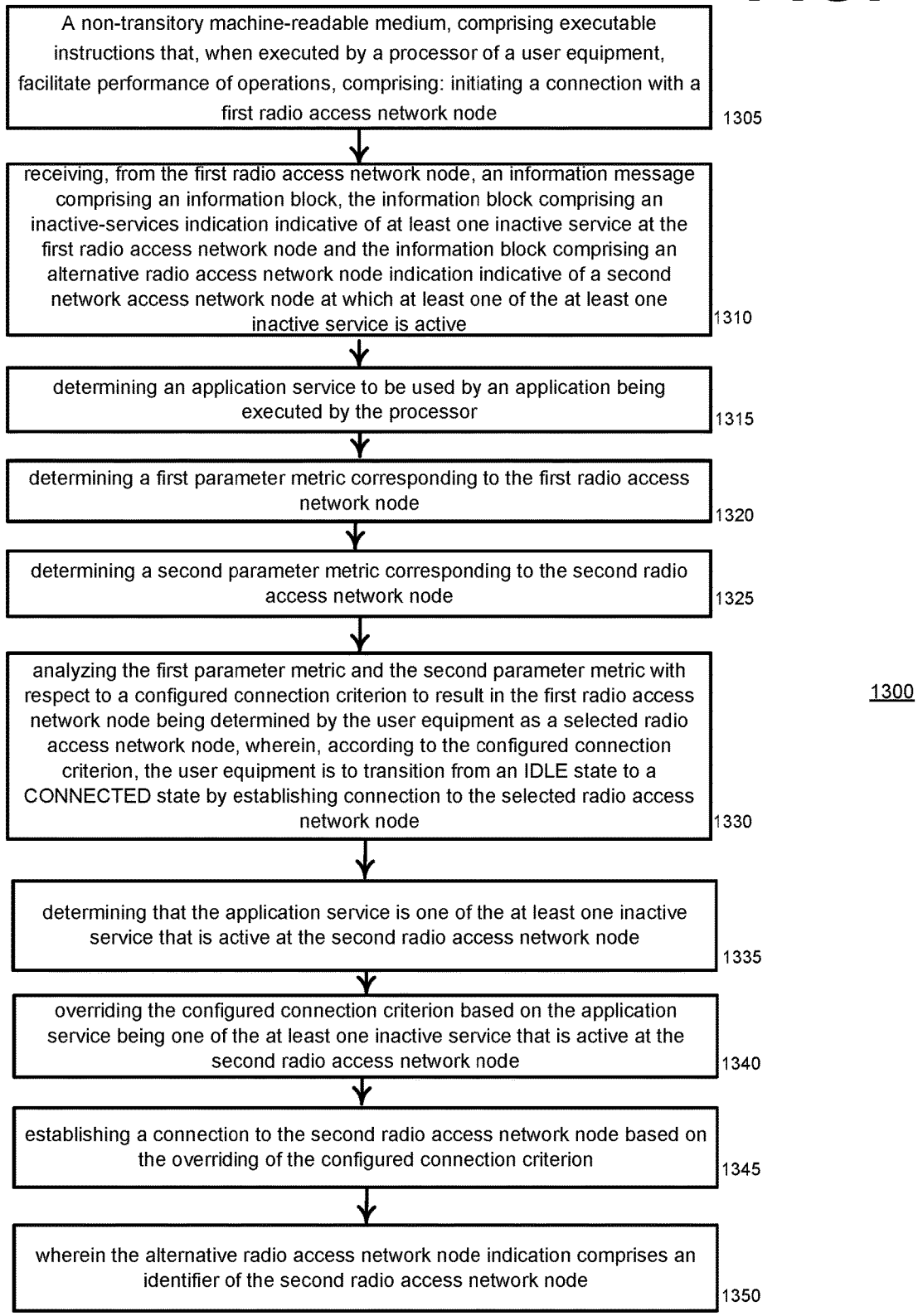
FIG. 13 illustrates a block diagram of an example non-transitory machine-readable medium embodiment.

Turning now to FIG. 13, the figure illustrates a non-transitory machine-readable medium 1300 comprising at block 1305 executable instructions that, when executed by a processor of a user equipment, facilitate performance of operations, comprising: initiating a connection with a first radio access network node; at block 1310 receiving, from the first radio access network node, an information message comprising an information block, the information block comprising an inactive-services indication indicative of at least one inactive service at the first radio access network node and the information block comprising an alternative radio access network node indication indicative of a second network access network node at which at least one of the at least one inactive service is active; at block 1315 determining an application service to be used by an application being executed by the processor; at block 1320 determining a first parameter metric corresponding to the first radio access network node; at block 1325 determining a second parameter metric corresponding to the second radio access network node; at block 1330 analyzing the first parameter metric and the second parameter metric with respect to a configured connection criterion to result in the first radio access network node being determined by the user equipment as a selected radio access network node, wherein, according to the configured connection criterion, the user equipment is to transition from an IDLE state to a CONNECTED state by establishing connection to the selected radio access network node; at block 1335 determining that the application service is one of the at least one inactive service that is active at the second radio access network node; at block 1340 overriding the configured connection criterion based on the application service being one of the at least one inactive service that is active at the second radio access network node; at block 1345 establishing a connection to the second radio access network node based on the overriding of the configured connection criterion; and at block 1350 wherein the alternative radio access network node indication comprises an identifier of the second radio access network node.

Figure 14:
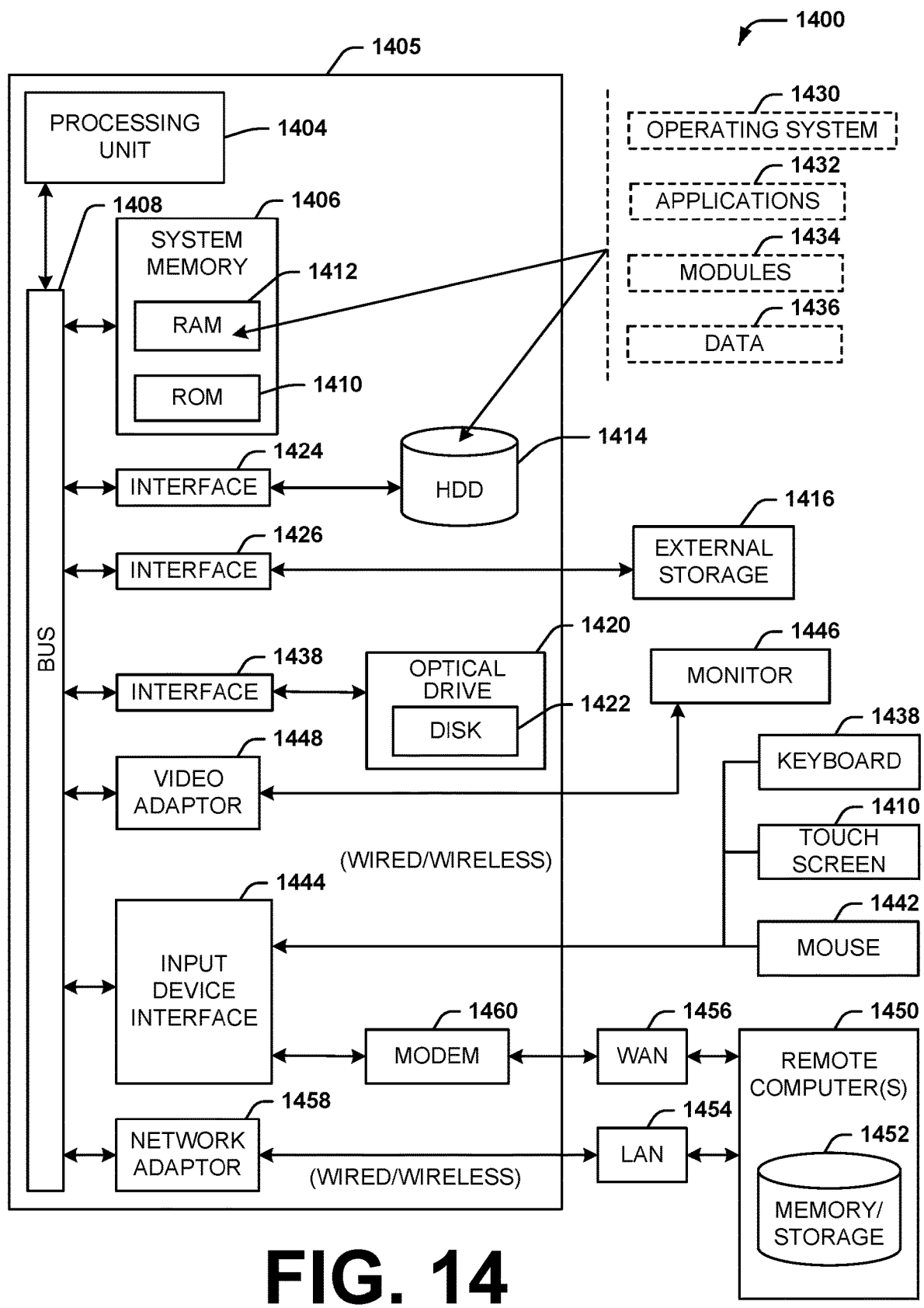
FIG. 14 illustrates an example computer environment.

In order to provide additional context for various embodiments described herein, FIG. 14 and the following discussion are intended to provide a brief, general description of a suitable computing environment 1400 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors and may include a cache memory. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

Computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid-state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can comprise a security module, such as a trusted processing module (TPM). For instance, with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 15:
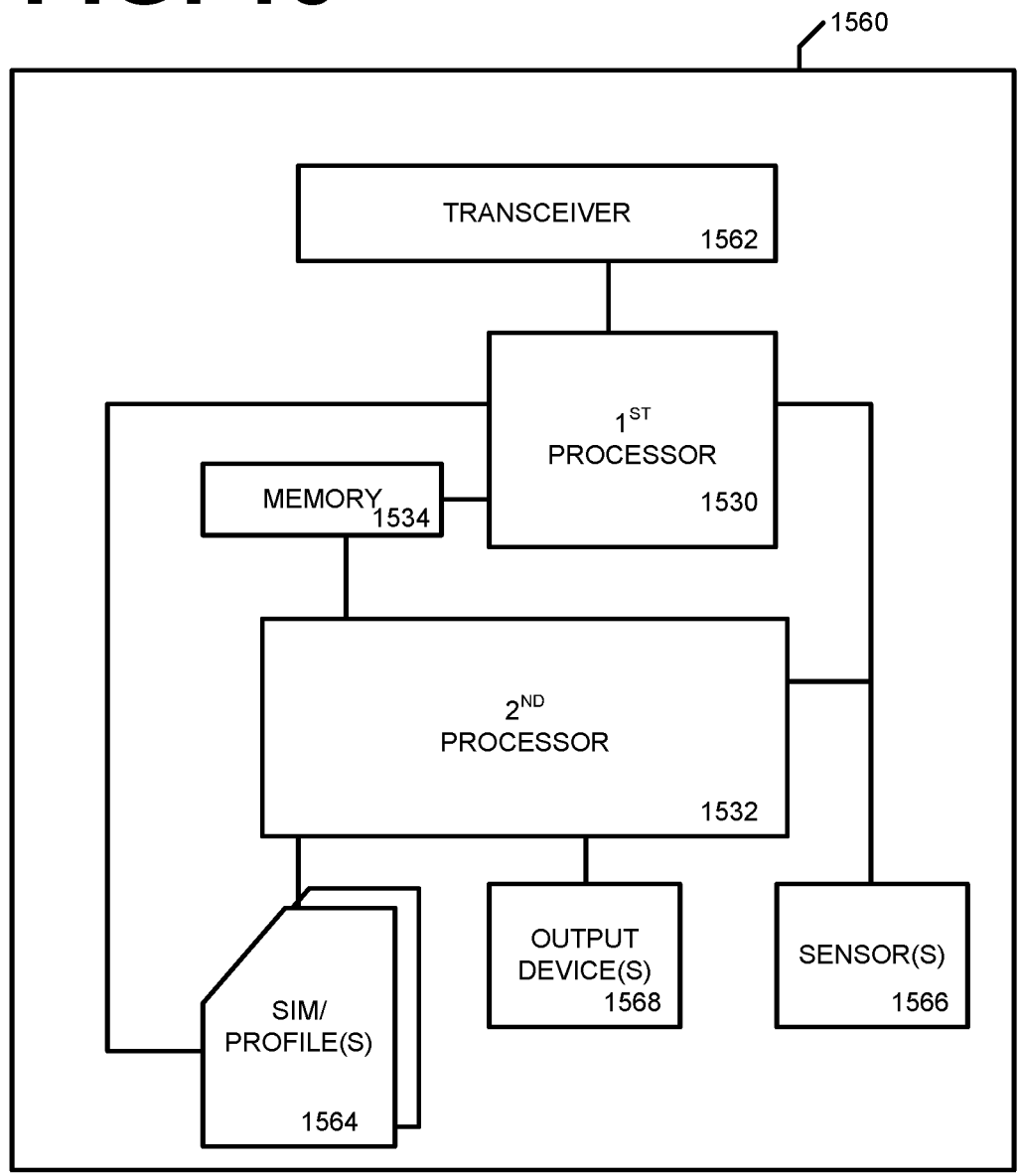
FIG. 15 illustrates a block diagram of an example wireless user equipment.

Turning now to FIG. 15, the figure illustrates a block diagram of an example UE 1560. UE 1560 may comprise a smart phone, a wireless tablet, a laptop computer with wireless capability, a wearable device, a machine device that may facilitate vehicle telematics, and the like. UE 1560 comprises a first processor 1530, a second processor 1532, and a shared memory 1534. UE 1560 includes radio front end circuitry 1562, which may be referred to herein as a transceiver, but is understood to typically include transceiver circuitry, separate filters, and separate antennas for facilitating transmission and receiving of signals over a wireless link, such as one or more wireless links 125, 135, or 137 shown in FIG. 1. Furthermore, transceiver 1562 may comprise multiple sets of circuitry or may be tunable to accommodate different frequency ranges, different modulations schemes, or different communication protocols, to facilitate long-range wireless links, such as links 125, device-to-device links, such as links 135, and short-range wireless links, such as links 137.

Continuing with description of FIG. 15, UE 1560 may also include a SIM 1564, or a SIM profile, which may comprise information stored in a memory (memory 34 or a separate memory portion), for facilitating wireless communication with RAN 105 or core network 130 shown in FIG. 1. FIG. 15 shows SIM 1564 as a single component in the shape of a conventional SIM card, but it will be appreciated that SIM 1564 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1564 and another device, which may be a component of RAN 105 or core network 130 shown in FIG. 1). A SIM profile 1564 may also comprise identifying information that is unique to the SIM, or SIM profile, such as, for example, an International Mobile Subscriber Identity ("IMSI") or information that may make up an IMSI.

SIM 1564 is shown coupled to both the first processor portion 1530 and the second processor portion 1532. Such an implementation may provide an advantage that first processor portion 30 may not need to request or receive information or data from SIM 1564 that second processor 1532 may request, thus eliminating the use of the first processor acting as a 'go-between' when the second processor uses information from the SIM in performing its functions and in executing applications. First processor 1530, which may be a modem processor or baseband processor, is shown smaller than processor 1532, which may be a more sophisticated application processor, to visually indicate the relative levels of sophistication (i.e., processing capability and performance) and corresponding relative levels of operating power consumption levels between the two processor portions. Keeping the second processor portion 1532 asleep/inactive/in a low power state when UE 1560 does not need it for executing applications and processing data related to an application provides an advantage of reducing power consumption when the UE only needs to use the first processor portion 1530 while in listening mode for monitoring routine configured bearer management and mobility management/maintenance procedures, or for monitoring search spaces that the UE has been configured to monitor while the second processor portion remains inactive/asleep.

UE 1560 may also include sensors 1566, such as, for example, temperature sensors, accelerometers, gyroscopes, barometers, moisture sensors, and the like that may provide signals to the first processor 1530 or second processor 1532. Output devices 1568 may comprise, for example, one or more visual displays (e.g., computer monitors, VR appliances, and the like), acoustic transducers, such as speakers or microphones, vibration components, and the like. Output devices 1568 may comprise software that interfaces with output devices, for example, visual displays, speakers, microphones, touch sensation devices, smell or taste devices, and the like, that are external to UE 1560.

The following glossary of terms given in Table 1 may apply to one or more descriptions of embodiments disclosed herein.

TABLE 1

| Term | Definition |
| --- | --- |
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| CBR | Channel busy ratio |
| SCI | Sidelink control information |
| SBFD | Sub-band full duplex |
| CLI | Cross link interference |
| TDD | Time division duplexing |
| FDD | Frequency division duplexing |
| BS | Base-station |
| RS | Reference signal |
| CSI-RS | Channel state information reference signal |
| PTRS | Phase tracking reference signal |
| DMRS | Demodulation reference signal |
| BS | Base-station |
| gNB | General NodeB |
| PUCCH | Physical uplink control channel |
| PUSCH | Physical uplink shared channel |
| SRS | Sounding reference signal |
| NES | Network energy saving |
| QCI | Quality class indication |
| RSRP | Reference signal received power |
| PCI | Primary cell ID9 |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   determining, by a user equipment comprising a processor, a first parameter metric corresponding to a first radio access network node;
   analyzing the first parameter metric with respect to a configured first parameter criterion to result in an analyzed first parameter metric;
   initiating, by the user equipment, a connection establishment procedure with the first radio access network node based on the analyzed first parameter metric being determined to satisfy the configured first parameter criterion; and
   receiving, by the user equipment from the first radio access network node, an information message comprising an inactive-services indication indicative of at least one service that is in an inactive state at the first radio access network node, an alternative radio access network node indication indicative of a second radio access network node at which the at least one service is in an active state, and a network energy saving mode duration indication indicative of a network energy saving period during which the at least one service is to be in the inactive state.

2. The method of claim 1, further comprising:
   establishing, by the user equipment, a connection with the second radio access network node, based on the alternative radio access network node indication.

3. The method of claim 1, wherein the alternative radio access network node indication comprises an identifier of the second radio access network node.

4. The method of claim 1, wherein the alternative radio access network node indication is received from the first radio access network node in a system information block 1.

5. The method of claim 1, wherein the configured first parameter criterion comprises a signal strength criterion, and wherein the first parameter metric is a first signal strength indication indicative of a first signal strength corresponding to the first radio access network node.

6. The method of claim 1, wherein the inactive-services indication comprises at least one of: at least one listing of at least one service, at least one traffic priority identifier, at least one flow identifier, or at least one quality class indication identifier, corresponding, respectively, to the at least one service that is in the inactive state, at least one priority, at least one flow, or at least one quality class that is unavailable at the first radio access network node during the network energy saving period.

7. The method of claim 5, further comprising:
   determining, by the user equipment, a second parameter metric corresponding to the second radio access network node;
   analyzing the second parameter metric with respect to the configured first parameter criterion to result in an analyzed second parameter metric, wherein the second parameter metric is a second signal strength indication indicative of a second signal strength corresponding to the second radio access network node, wherein the configured first parameter criterion comprises a signal strength threshold, wherein the analyzed first parameter metric is determined to satisfy the configured first parameter criterion, and wherein the analyzed second parameter metric is determined to satisfy the configured first parameter criterion; and
   establishing, by the user equipment, a connection with the second radio access network node, based on the alternative radio access network node indication.

8. The method of claim 5, further comprising:
   determining, by the user equipment, a second parameter metric corresponding to the second radio access network node; and
   establishing, by the user equipment, a connection with the second radio access network node according to the alternative radio access network node indication,
   wherein the second parameter metric is a second signal strength indication indicative of a second signal strength corresponding to the second radio access network node, wherein the first signal strength is higher than the second signal strength, wherein the configured first parameter criterion comprises a function that is satisfied by the first signal strength being higher than the second signal strength, and wherein establishing the connection with the second radio access network node, according to the alternative radio access network node indication, comprises overriding the configured first parameter criterion.

9. The method of claim 5, wherein the alternative radio access network node indication is indicative of a third radio access network node at which the at least one service is in an active state, the method further comprising:
   determining, by the user equipment, a third parameter metric corresponding to the third radio access network node,
   wherein the third parameter metric is a third signal strength indication indicative of a third signal strength corresponding to the third radio access network node, wherein the first signal strength is higher than the second signal strength, wherein the second signal strength is lower than the third signal strength, and wherein the configured first parameter criterion comprises a function that is satisfied by the first signal strength being higher than the second signal strength or by the third signal strength being higher than the second signal strength,
   the method further comprising:
   determining, by the user equipment, a service, of the at least one service indicated by the inactive-services indication, requested by the user equipment, to result in a determined service,
   wherein the inactive-services indication is indicative of: a first period indication indicative of a first time corresponding to the inactive state of the determined service at the first radio access network node, a second period indication indicative of a second time corresponding to the active state of the determined service at the second radio access network node, and a third period indication indicative of a third time corresponding to the active state of the determined service at the third radio access network node,
   the method further comprising:
   determining, by the user equipment, a second parameter criterion corresponding to use by the user equipment of the determined service;
   analyzing the first time, the second time, and the third time with respect to the second parameter criterion, to result in: a determined first service-availability, a determined second service-availability, and a determined third service-availability, respectively; and determining that the determined second service-availability satisfies the second parameter criterion and that the third service-availability fails to satisfy the second parameter criterion,
wherein establishing a connection with the second radio access network node comprises overriding the configured first parameter criterion.

10. The method of claim 5, wherein the second parameter metric is a second signal strength indication indicative of a second signal strength corresponding to the second radio access network node, wherein the first signal strength is higher than the second signal strength, wherein the configured first parameter criterion comprises a function that is satisfied by the first signal strength being higher than the second signal strength, and wherein the inactive-services indication is indicative of: a first period indication indicative of a first time corresponding to the inactive state of the determined service at the first radio access network node and a second period indication indicative of a second time corresponding to the active state of the determined service at the second radio access network node,
the method further comprising:
determining, by the user equipment, a service, of the at least one service indicated by the inactive-services indication, requested by the user equipment, to result in a determined service;
determining, by the user equipment, a second parameter criterion comprising a requested time of use of the determined service by the user equipment;
analyzing, by the user equipment, the first time and the second time with respect to the second parameter criterion, to result in: a determined first service-availability and a determined second service-availability; and
determining, by the user equipment, that the determined first service-availability satisfies the second parameter criterion and that the determined second service-availability satisfies the second parameter criterion; and
establishing, by the user equipment, a connection with the first radio access network node according to the first time.

11. The method of claim 9, wherein the second parameter criterion comprises a needed time of use of the determined service by the user equipment.

12. The method of claim 11, wherein the user equipment is a machine-to-machine device.

13. A user equipment, comprising:
a processor configured to:
determine a first parameter metric corresponding to a first radio access network node;
determine a second parameter metric corresponding to a second radio access network node;
analyze the first parameter metric with respect to a configured parameter criterion to result in an analyzed first parameter metric;
analyze the second parameter metric with respect to the configured parameter criterion to result in an analyzed second parameter metric;
determine a requested resource to request from the first radio access network node or from the second radio access network node;
initiate a connection with the first radio access network node based on the analyzed first parameter metric satisfying the configured parameter criterion and based on the analyzed second parameter metric failing to satisfy the configured parameter criterion; and
receive, from the first radio access network node, an information block comprising an unavailable-resources indication indicative of the requested resource being unavailable at the first radio access network node, wherein the information block comprises an alternative radio access network node indication indicative of the requested resource being available at the second radio access network node, and wherein the information block comprises a network energy saving mode duration indication indicative of a period during which the at least one requested resource is to be unavailable at first radio access network node.

14. The user equipment of claim 13, the processor further configured to:
determine to disregard the analyzed second parameter metric failing to satisfy the configured parameter criterion; and
establish a connection with the second radio access network node based on the alternative radio access network node indication.

15. The user equipment of claim 13, wherein the alternative radio access network node indication comprises an identifier corresponding to the second radio access network node.

16. The user equipment of claim 13, wherein the requested resource comprises a service and wherein the unavailable-resources indication comprises a service identifier corresponding to the service.

17. The user equipment of claim 13, wherein the requested resource comprises a Quality-of-Service requested to support a service, and wherein the unavailable-resources indication comprises a Quality Class Indication indicative of the Quality-of-Service requested to support the service not being available at the first radio access network node.

18. A non-transitory machine-readable medium, comprising executable instructions that, when executed by a processor of a user equipment, facilitate performance of operations, comprising:
initiating a connection with a first radio access network node; and
receiving, from the first radio access network node, an information message comprising an information block, the information block comprising an inactive-services indication indicative of at least one inactive service at the first radio access network node and the information block comprising an alternative radio access network node indication indicative of a second network access network node at which at least one of the at least one inactive service is active, wherein the alternative radio access network node indication comprises a network energy saving mode duration indication indicative of a time corresponding to the at least one inactive service at the first radio access network node being inactive.

19. The non-transitory machine-readable medium of claim 18, the operations further comprising:
determining an application service to be used by an application being executed by the processor;
determining a first parameter metric corresponding to the first radio access network node;
determining a second parameter metric corresponding to the second radio access network node;
analyzing the first parameter metric and the second parameter metric with respect to a configured connection criterion to result in the first radio access network node being determined by the user equipment as a selected radio access network node, wherein, according to the configured connection criterion, the user equipment is to transition from an IDLE state to a CONNECTED state by establishing connection to the selected radio access network node;

determining that the application service is one of the at least one inactive service that is active at the second radio access network node;

overriding the configured connection criterion based on the application service being one of the at least one inactive service that is active at the second radio access network node; and establishing a connection to the second radio access network node based on the overriding of the configured connection criterion.

20. The non-transitory machine-readable medium of claim 18, wherein the alternative radio access network node indication comprises an identifier of the second radio access network node.

* * * * *